(12) United States Patent
Walters et al.

(10) Patent No.: US 12,393,940 B2
(45) Date of Patent: *Aug. 19, 2025

(54) AUTOMATIC TRANSACTION EXECUTION BASED ON TRANSACTION LOG ANALYSIS

(71) Applicant: Capital One Services, LLC, McLean, VA (US)

(72) Inventors: Austin Walters, Savoy, IL (US); Jeremy Goodsitt, Champaign, IL (US); Galen Rafferty, Mahomet, IL (US); Vincent Pham, Champaign, IL (US); Anh Truong, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 97 days.

This patent is subject to a terminal disclaimer.

(21) Appl. No.: 18/508,461

(22) Filed: Nov. 14, 2023

(65) Prior Publication Data

US 2024/0078545 A1    Mar. 7, 2024

Related U.S. Application Data

(63) Continuation of application No. 16/876,799, filed on May 18, 2020, now Pat. No. 11,854,004.

(51) Int. Cl.
*G06Q 40/00* (2023.01)
*G06Q 20/38* (2012.01)
*G06Q 20/40* (2012.01)

(52) U.S. Cl.
CPC ......... *G06Q 20/389* (2013.01); *G06Q 20/401* (2013.01)

(58) Field of Classification Search
CPC ................ G06Q 20/389; G06Q 20/401
See application file for complete search history.

(56) References Cited

U.S. PATENT DOCUMENTS 7,107,244 B2   9/2006   Kight et al.
8,433,654 B2   4/2013   Subbarao et al.
(Continued)

FOREIGN PATENT DOCUMENTS

CA   2791502 A1 *   9/2011   ............. G06Q 20/10
CA   3057961 A1     4/2020

OTHER PUBLICATIONS

Guidotti et al: "Personalized Market Basket Prediction with Temporal Annotated Recurring Sequences", EEE Transactions on Knowledge and Data Engineering, vol. 31, Issue: 11, Nov. 1, 2019 (Year: 2019).*

(Continued)

*Primary Examiner* — Edward J Baird
(74) *Attorney, Agent, or Firm* — Harrity & Harrity, LLP

(57) ABSTRACT

A device may receive a preauthorization associated with missed transaction prevention for a transaction account of a user, wherein the missed transaction prevention involves preventing a missed transaction associated with merchant accounts of the user. The device may monitor a transaction log of the transaction account and identify a transaction pattern associated with a merchant account based on a plurality of historical transactions identified in the transaction log related to the merchant account. The device may determine that a historical transaction of the plurality of historical transactions is not designated for automatic execution and that an execution of an upcoming transaction corresponding to the plurality of historical transactions is not scheduled. The device may cause an account transaction associated with the upcoming transaction to be automatically executed before a transaction period expiration, associated with the merchant account, passes.

20 Claims, 10 Drawing Sheets

(56) References Cited

U.S. PATENT DOCUMENTS

| | | | |
|---|---|---|---|
| 8,484,104 | B1 | 7/2013 | Hurlbutt et al. |
| 8,572,083 | B1 | 10/2013 | Snell et al. |
| 10,803,432 | B1 | 10/2020 | Miles |
| 11,176,558 | B1* | 11/2021 | Cohn .................... G06Q 20/40 |
| 2009/0300589 | A1 | 12/2009 | Watters et al. |
| 2010/0114748 | A1 | 5/2010 | Duke et al. |
| 2012/0239479 | A1* | 9/2012 | Amaro ................. H04W 4/021 |
| | | | 709/204 |
| 2013/0097073 | A1 | 4/2013 | Keld |
| 2014/0136343 | A1* | 5/2014 | Ringdahl ........... G06Q 30/0273 |
| | | | 705/14.71 |
| 2014/0279041 | A1 | 9/2014 | Isaacson et al. |
| 2015/0262183 | A1* | 9/2015 | Gervais ............... G06Q 20/405 |
| | | | 705/44 |
| 2017/0032343 | A1 | 2/2017 | Kurniadi et al. |
| 2018/0005229 | A1 | 1/2018 | Grassadonia |
| 2019/0312883 | A1 | 10/2019 | McCarter et al. |
| 2020/0027083 | A1 | 1/2020 | Patrni et al. |
| 2020/0184434 | A1 | 6/2020 | Evans et al. |
| 2020/0184449 | A1* | 6/2020 | Melgar .................. G06Q 20/10 |
| 2020/0380528 | A1 | 12/2020 | Ganapathy et al. |
| 2021/0357923 | A1 | 11/2021 | Walters et al. |
| 2022/0319283 | A1 | 10/2022 | Misra et al. |

OTHER PUBLICATIONS

Guidotti R., "Next Basket Prediction using Recurring Sequential Patterns Department of Computer Science," Feb. 2017, pp. 1-27.

* cited by examiner

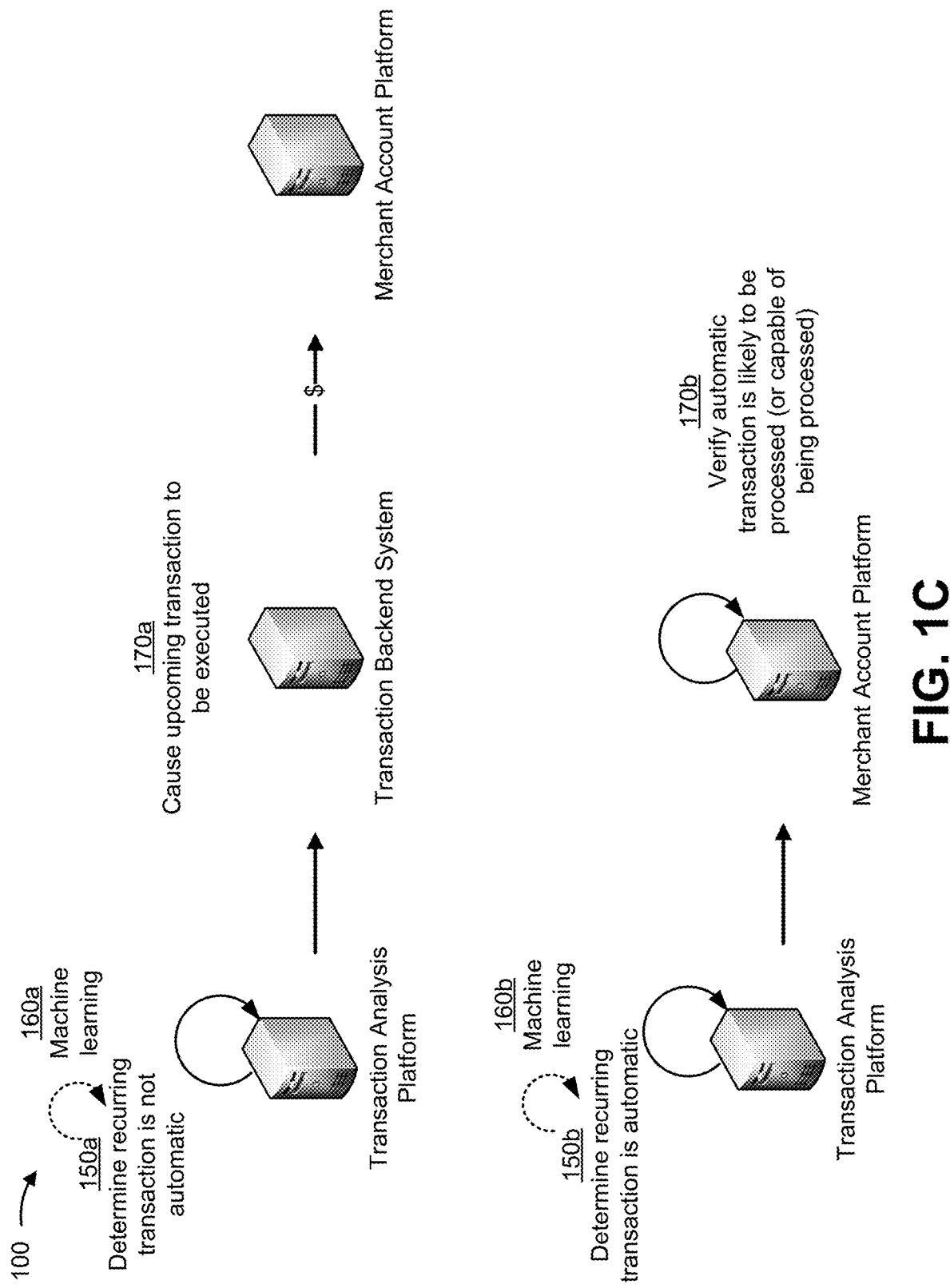

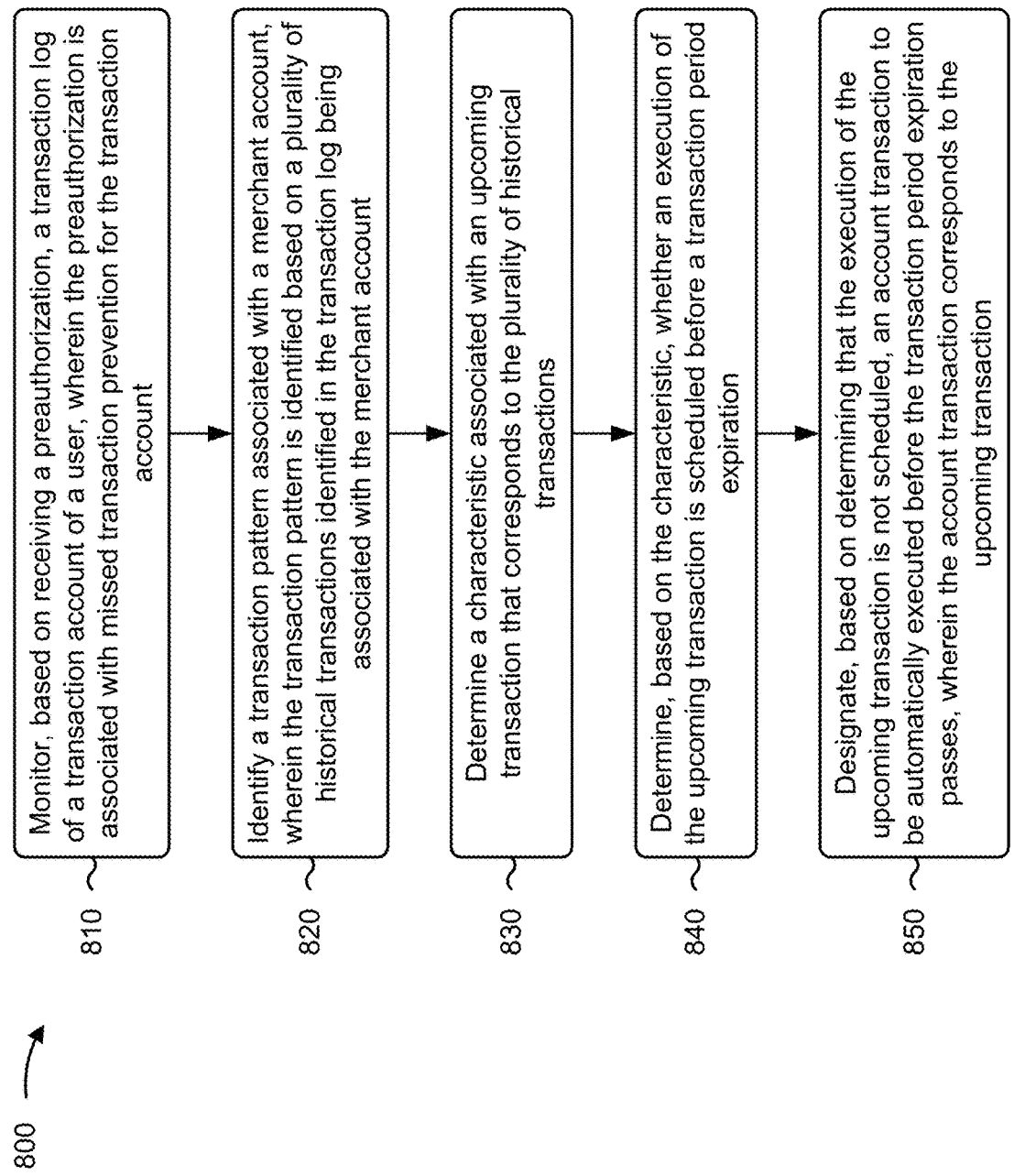

AUTOMATIC TRANSACTION EXECUTION BASED ON TRANSACTION LOG ANALYSIS

RELATED APPLICATION

This application is a continuation of U.S. patent application Ser. No. 16/876,799, filed May 18, 2020, which is incorporated herein by reference in its entirety.

BACKGROUND

Transactions associated with a merchant (e.g., a provider of goods and/or services) may be executed regularly by a user. A regularly occurring transaction may be associated with a transaction period (e.g., a time period in which the regularly occurring transaction must be completed) set by the merchant associated with the regularly occurring transaction. The regularly occurring transaction may be automatically executed (e.g., scheduled for execution before the transaction period expires) or the transaction may be executed manually by the user.

SUMMARY

According to some implementations, a method may include receiving, by a device, a preauthorization associated with missed transaction prevention for a transaction account of a user, wherein the missed transaction prevention involves preventing an occurrence of a missed transaction associated with merchant accounts of the user; monitoring, by the device and based on the preauthorization, a transaction log of the transaction account; identifying, by the device, a transaction pattern associated with a merchant account, wherein the transaction pattern is identified based on a plurality of historical transactions identified in the transaction log being associated with the merchant account; determining, by the device and based on the transaction pattern, that a historical transaction of the plurality of historical transactions is not designated for automatic execution; determining, by the device and based on determining that the historical transaction is not designated for automatic execution, that an execution of an upcoming transaction corresponding to the plurality of historical transactions is not scheduled; and causing, by the device, an account transaction associated with the upcoming transaction to be automatically executed before a transaction period expiration, that is associated with the merchant account, passes.

According to some implementations, a device may include one or more memories; and one or more processors, communicatively coupled to the one or more memories, configured to: receive a preauthorization associated with missed transaction prevention for a transaction account of a user; monitor, based on the preauthorization, a transaction log of the transaction account; identify a transaction pattern associated with a merchant account, wherein the transaction pattern is identified based on a plurality of historical transactions identified in the transaction log being associated with the merchant account; determine, based on a characteristic of the merchant account, whether the merchant account is designated for automatic execution of transactions; and designate, based on determining that the merchant account is not designated for automatic execution of transactions, an account transaction to be automatically executed to prevent a missed transaction involving the merchant account.

According to some implementations, a non-transitory computer-readable medium may store one or more instructions. The one or more instructions, when executed by one or more processors of a device, may cause the one or more processors to: monitor, based on receiving a preauthorization, a transaction log of a transaction account of a user, wherein the preauthorization is associated with missed transaction prevention for the transaction account; identify a transaction pattern associated with a merchant account, wherein the transaction pattern is identified based on a plurality of historical transactions identified in the transaction log being associated with the merchant account; determine a characteristic associated with an upcoming transaction that corresponds to the plurality of historical transactions; determine, based on the characteristic, whether an execution of the upcoming transaction is scheduled before a transaction period expiration; and designate, based on determining that the execution of the upcoming transaction is not scheduled, an account transaction to be automatically executed before the transaction period expiration passes, wherein the account transaction corresponds to the upcoming transaction.

BRIEF DESCRIPTION OF THE DRAWINGS

FIGS. 1A-1C are diagrams of one or more example implementations described herein.

FIGS. 6-8 are flowcharts of example processes for automatic transaction execution based on transaction log analysis.

DETAILED DESCRIPTION

Figure 1A:
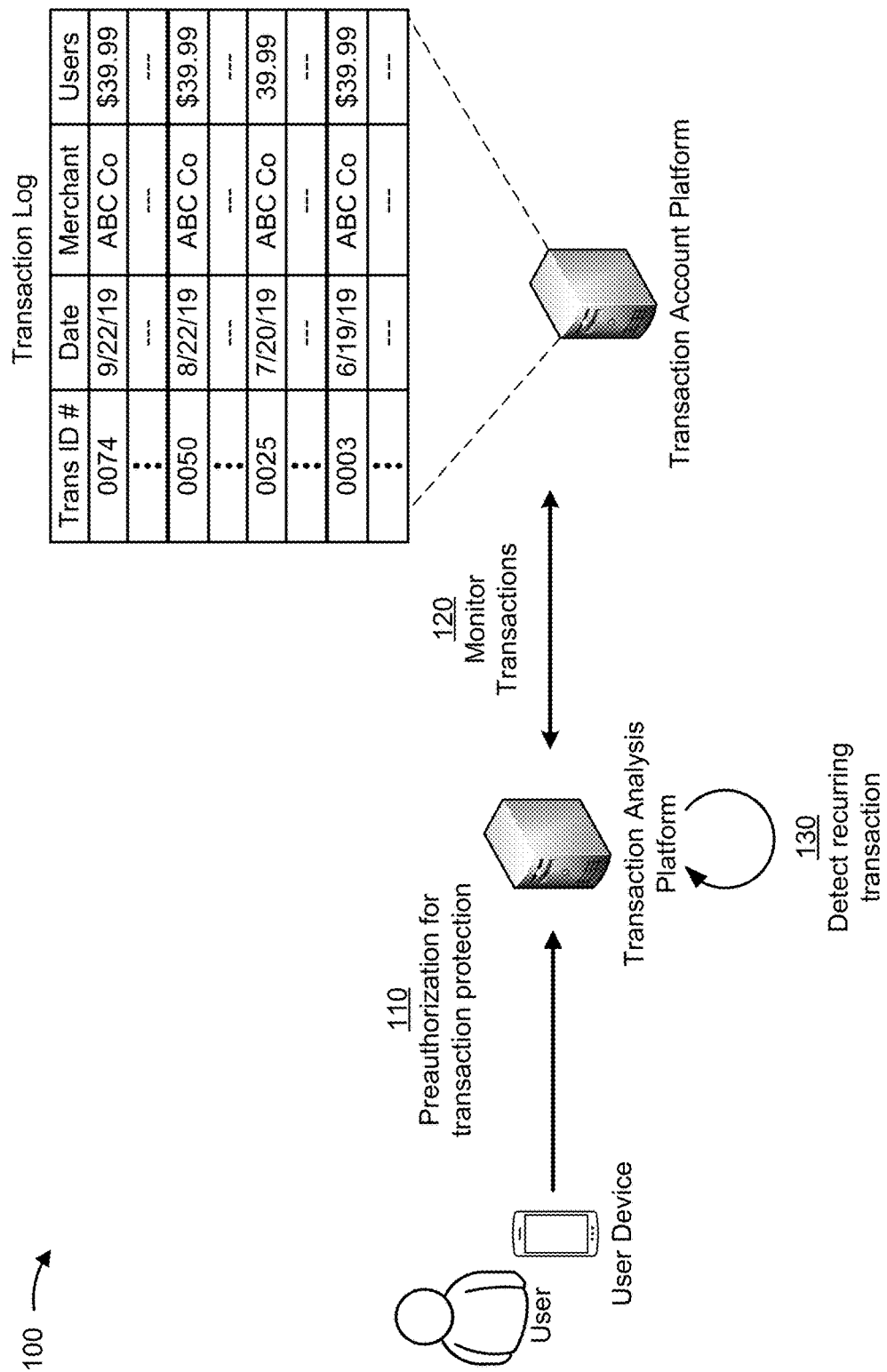

The following detailed description of example implementations refers to the accompanying drawings. The same reference numbers in different drawings may identify the same or similar elements.

A user of a user device may interact with a plurality of merchants (e.g., providers of goods and/or services). The user of the user device may complete recurring transactions (such as order transactions, bill transactions, mortgage transactions, lease transactions, and/or the like) with a merchant regularly over time via the user device. Some merchants may allow for the user to register for and/or authorize automatic execution of recurring transactions with the merchant (e.g., scheduling transactions to automatically occur). However, certain merchants may not provide the option for automatic execution of recurring transactions. Additionally, or alternatively, the user may not register for and/or authorize the automatic execution of recurring transactions.

When automatic execution of recurring transactions with a merchant is not enabled, the user may need to perform a number of actions using the user device to execute an upcoming transaction associated with the recurring transactions. For example, to execute the upcoming transaction, the user may need to locate a merchant system (e.g., an application, a website, and/or the like) associated with the execution of the upcoming transaction, determine a transaction period (e.g., a time period in which the upcoming transaction must be completed), determine a transaction amount for the upcoming transaction, provide information associated with a transaction account (e.g., a bank account, an expense account, a credit account, and/or the like) associated with the user to the merchant platform, and/or request or initiate a transaction from the transaction account to execute the upcoming transaction. This may waste computing resources (e.g., processing resources, memory resources, communication resources, and/or the like) associated with the user device by requiring a number of additional steps to be performed on the user device to execute the upcoming transaction associated with the recurring transactions.

When the user misses a transaction associated with the recurring transactions (e.g., does not execute the upcoming transaction and/or does not execute the upcoming transaction within the transaction period), additional steps may be required to be performed on the user device. For example, the user may use the user device (or another device) to investigate, contest, and/or object to the missed transaction. This may waste computing resources and/or network resources associated with identifying the missed transaction, investigating the missed transaction, executing the missed transaction, and/or contacting the merchant associated with the missed transaction. The merchant may also be negatively impacted and waste computing resources and/or network resources associated with attempting to identify, detect, investigate, execute, and/or remedy the missed transaction.

Some implementations described herein enable a transaction analysis platform to automatically execute transactions based on transaction log analysis. The transaction analysis platform may run on or in combination with a user device. The transaction analysis platform may provide a missed transaction prevention service that receives a preauthorization from the user device to access information associated with a transaction account (e.g., a bank account, an expense account, a credit account, and/or the like) of a user of the user device. The transaction analysis platform may monitor a transaction log (e.g., a log of each transaction executed associated with the transaction account) of the transaction account and identify a transaction pattern (such as recurring transactions) associated with a merchant account (e.g., an account associated with a merchant that provides goods and/or services). The transaction analysis platform may analyze a plurality of historical transactions (e.g., past transactions) within the transaction pattern associated with the merchant account to determine that the plurality of historical transactions are not associated with automatic execution, to determine a transaction period (e.g., a time period in which an upcoming transaction associated with the historical transactions must be completed), and/or to determine a transaction amount. The transaction analysis platform may determine that the upcoming transaction associated with the historical transactions is not scheduled to be executed based on the determination that the plurality of historical transactions are not associated with automatic execution. The transaction analysis platform may cause an account transaction (e.g., a transaction from the transaction account of the user to the merchant account) associated with the upcoming transaction to be automatically executed before the transaction period passes.

As a result, the transaction analysis platform conserves computing resources of the user device and/or network resources that would have been otherwise used to locate a merchant system (e.g., an application, a website, and/or the like) associated with the execution of the upcoming transaction, determine the transaction period, determine the transaction amount, provide information associated with the transaction account associated with the user to the merchant platform, and/or request or initiate a transaction from the transaction account to complete the upcoming transaction. Additionally, some implementations described herein may enable the transaction analysis platform to execute the upcoming transaction before the user misses the upcoming transaction (e.g., does not execute the upcoming transaction and/or does not executed the upcoming transaction within the transaction period). As a result, the transaction analysis platform conserves computing resources of the user device and/or network resources that would have otherwise been used to identify the missed transaction, investigate the missed transaction, execute the missed transaction, and/or contact the merchant associated with the missed transaction. The merchant associated with the missed transaction may conserve computing resources and/or network resources that would have otherwise been used to identify, detect, investigate, execute, and/or remedy the missed transaction.

Figure 1B:
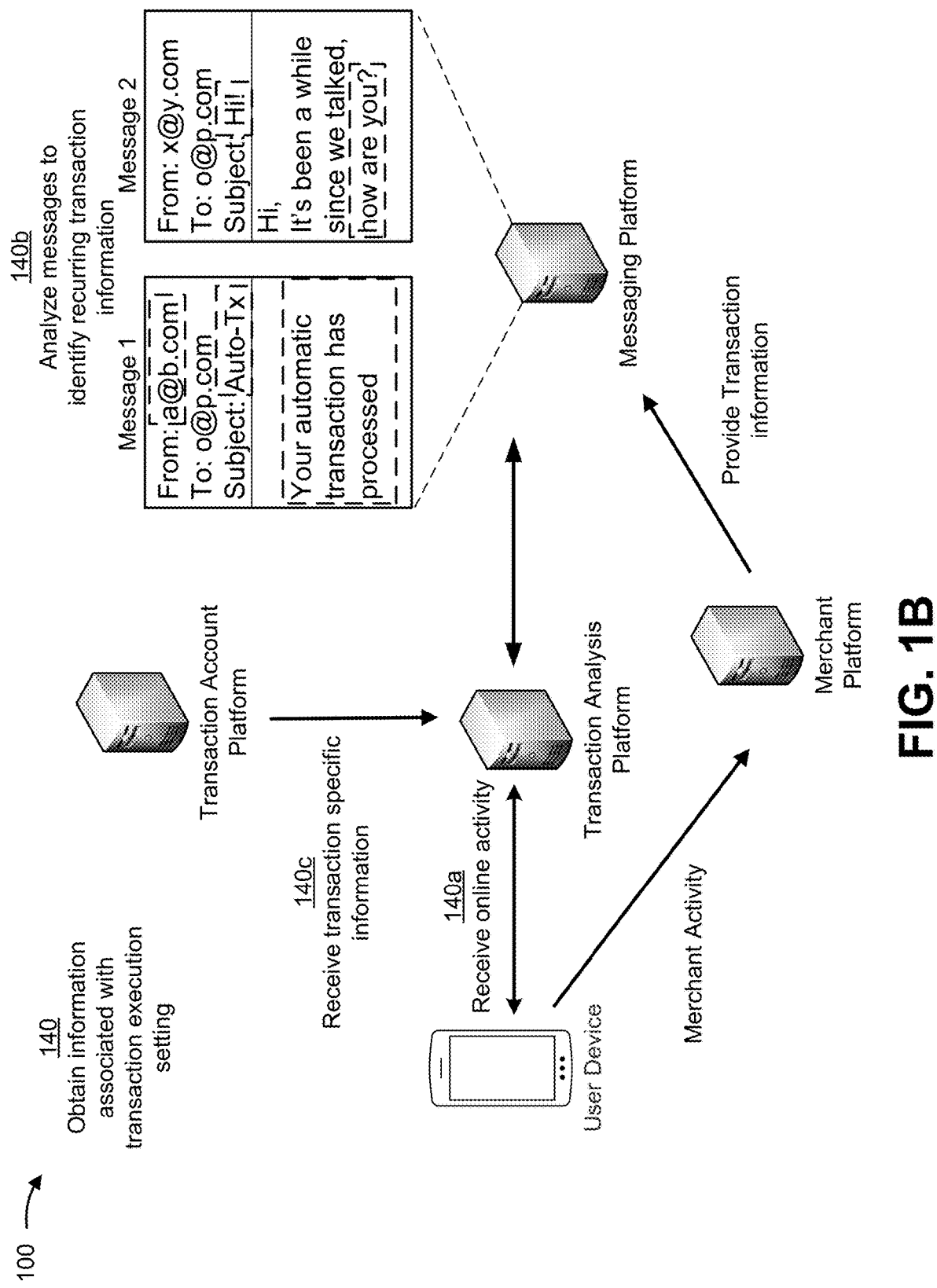

FIGS. 1A-1C are diagrams of one or more example implementations 100 described herein. As shown in FIGS. 1A-1C, a user device may be associated with a transaction analysis platform, a transaction account platform, a merchant platform, a messaging platform, a transaction backend system, and a merchant platform. A user of the user device may interact with the user device to register for a missed transaction prevention service with the transaction analysis platform. The missed transaction prevention service may enable the transaction analysis platform to automatically execute transactions based on an analysis of a transaction log of a transaction account associated with the user, an analysis of historical transactions associated with a merchant, and/or a determination that an upcoming transaction associated with the historical transactions is not designated for automatic executions. In some implementations, one or more (or all) of the functions described as being performed by the transaction analysis platform may be performed by the user device. In some implementations, one or more (or all) of the functions described as being performed by the transaction analysis platform may be performed by collectively by the transaction analysis platform and the user device.

As shown in FIG. 1A, and by reference number 110, the transaction analysis platform may receive, from the user device, a preauthorization associated with the missed transaction prevention service that enables the transaction analysis platform to access information (e.g., that permits the transaction analysis platform to monitor a transaction account (e.g., a financial account, such as a bank account, a credit account, a debit account, and/or the like) associated with the user, and/or a merchant account (e.g., an account of the user associated with a merchant that provides goods and/or services) associated with the user).

For example, the user device may be associated with the user, and the access information may include a set of credentials associated with an account of the user, such as a transaction account of the user, a merchant account of the user, a messaging account of the user, an online account (e.g., an internet browser account, a search engine account, a social media account, a merchant account, an online shopping account, and/or the like) of the user, and/or the like. The set of credentials may include a username/password combination for the user and the account, a security token (e.g., that provides limited access to the account) associated with the user and the account, a biometric associated with the user, and/or the like.

As described herein, the transaction account may be associated with (e.g., registered to, available to, and/or the like) the user to permit the user to engage in transactions via the transaction account (e.g., using funds associated with the transaction account). The transaction account may be managed and/or maintained by the transaction account platform for the user (e.g., by using a transaction log to permit the user to view and/or access transaction activity of the transaction account). In some implementations, the transaction account platform may manage hundreds, thousands, or more transaction accounts associated with a plurality of users, where each of the transaction accounts may be used in hundreds, thousands, or more transactions, and/or the like.

In some implementations, the merchant account may be associated with a merchant that provides goods and/or services. The user may be associated with a plurality of merchant accounts. The user may register for a merchant account using the merchant platform. The merchant account may include terms, such as that the merchant agrees to provide a good and/or service in exchange for the user completing a transaction of a set amount for each transaction period (e.g., a period in which the transaction must be completed). For example, the merchant may provide a subscription-based service that provides a good and/or service. The transactions may be recurring transactions (e.g., the transactions may occur regularly over a time, such as weekly, monthly, semi-yearly, yearly, and/or the like), such as bill transactions, mortgage transactions, lease transactions, subscription transactions, and/or the like. The merchant may set a transaction period for the transactions. For example, a merchant may set a transaction period of one month (e.g., the user must execute a transaction within a one-month period).

A failure to execute a transaction within the transaction period may result in a missed transaction. A missed transaction may result in penalties from the merchant (such as additional fees added to a future transaction with the merchant, cancellation of a service provided by the merchant, recapture of a good provided by the merchant, and/or the like). A missed transaction may result in a reduction of the creditworthiness of the user (e.g., a lowering of a credit score associated with the user).

In some implementations, the merchant may provide a payment plan (such as a transaction amount per transaction period over a set number of transaction periods). For example, if the price of a good and/or service provided by a merchant is $10,000, the merchant providing the good and/or service may offer a transaction amount of $1,000, and a transaction period of one month, such that the user would execute a transaction transferring $1,000 from a transaction account associated with the user to a transaction account associated with the merchant each month for ten total months.

The merchant account may enable the user to provide transaction account information associated with the user to the merchant platform to execute transactions for the goods and/or services provided by the merchant. In some implementations, the merchant platform may enable the user to register for an automatic transaction service associated with the merchant account of the user. The automatic transaction service may automatically execute transactions due from the user to the merchant based on the transaction amount set by the merchant and the transaction period set by the merchant.

In some implementations, a messaging account may include an email account, a text messaging account, an instant messaging account, a voice messaging account, and/or the like. In some implementations, a messaging account may be associated with messages (e.g., stored on the user device, stored on a messaging platform utilized by the user of the user device, and/or the like), such as email messages, text messages, instant messages, and/or the like. In some implementations, a messaging account may store hundreds, thousands, or more messages from hundreds, thousands, or more third parties, that include different types of content (e.g., personal content, transaction-related content, recurring transactions-related content, and/or the like). As described herein, the messaging account may receive transaction-related messages indicating an execution status of a transaction. Such a transaction-related message may include information identifying a date of execution of the transaction, an amount of the transaction, a merchant associated with the transaction, an automation status (e.g., whether the transaction was performed automatically) of the transaction, and/or the like.

In some implementations, an online account may include an internet browser account, a search engine account, a social media account, a merchant account, an online shopping account, and/or the like. The online account may be associated with the online activity of the user of the user device. In some implementations, the online account may be used for merchant activity, such as signing up for a merchant account, visiting a merchant platform, and/or the like.

In some implementations, the transaction analysis platform may receive the access information based on requesting the access information from the user device (e.g., by providing a prompt via a display associated with the user device), based on a user of the user device inputting the access information (e.g., via a user interface, via an application installed on the user device, and/or the like), and/or the like. According to some implementations, the transaction analysis platform may perform a verification process to verify that a user that provided the input is an authorized user of the user device and/or an authorized user associated with an account (such as a transaction account and/or a merchant account) described herein. Such a verification process may include requesting and processing credentials (e.g., a username, password, personal identification number, and/or the like) associated with an authorized user, personal information associated with an authorized user, security information associated with an authorized user, biometric information associated with an authorized user, and/or the like to authenticate the user. In some implementations, the transaction analysis platform may utilize a two-factor authentication process to receive authorization information from the user. The two-factor authentication process may increase a security of providing the transaction analysis platform with access to an account associated with the user by providing the transaction analysis platform with limited access to the account, by providing the user of the user device with control over whether the transaction analysis platform can access the account, and/or the like.

The verification process and/or the two-factor authentication process adds an additional level of security to any action performed by the transaction analysis platform and/or the user device. Verifying the identity of the user before allowing access to an account associated with the user and/or executing a transaction associated with the missed transaction prevention service allows for early identification of fraudulent activity. Verifying the identity of the user allows the transaction analysis platform to conserve user device computing resources that would have otherwise been used to perform the transaction, identify the fraudulent activity, investigate the fraudulent activity, and/or report the fraudulent activity. The merchant associated with the account and/or the transaction may also conserve computing resources that would have otherwise been used to reverse the fraudulent activity for the user, and/or identify, detect, and diagnose the fraudulent activity.

In some implementations, the access information may permit the transaction analysis platform to access a browser and/or software application associated with the user (e.g., a client application on the user device or another device associated with the user, a server application serving a client application of the user device, and/or the like) for monitoring online activity, social media activity, and/or the like. In some implementations, the transaction analysis platform may prompt the user of the user device to permit the transaction analysis platform to access the browser and/or software application associated with the user. In some implementations, after receiving the access information, the transaction analysis platform may access the browser and/or software application to monitor the user's online activity, social activity, and/or the like.

To maintain privacy of a user, the transaction analysis platform may ensure that the user opts in (e.g., via the preauthorization and/or the access information) to enable the transaction analysis platform to access the transaction account, to access to the merchant account, to access the messaging account, to monitor the transaction log associated with the transaction account, to monitor and/or access private information of the user, and/or the like. Accordingly, the transaction analysis platform may be configured to abide by any and all applicable laws with respect to maintaining the privacy of the user and/or content of the user's messaging account, transaction account, merchant account, and/or the like. In some implementations, the transaction analysis platform may not download (or permanently store) any messages, transaction information, audio or image files or data, and/or the like, from the user device, the transaction analysis platform may anonymize and/or encrypt any private information associated with the user and/or accounts, messages, images, audio, and/or the like of the user, and/or the like.

In some implementations, the transaction analysis platform may have or may be configured to have limited access to the transaction account, the merchant account, the messaging account, images or audio associated with the user, and/or the like. For example, the transaction analysis platform may be configured to have access to the transaction account periodically and for a threshold time period and/or to a limited number of most recently posted transactions (e.g., the last ten transactions, twenty transactions, and/or the like), to have access to a limited number of most recently received messages (e.g., the last ten messages, twenty messages, and/or the like), to have access to messages with certain keywords or phrases (e.g., keywords or phrases representative of a transaction, keywords or phrases representative of an automatic transaction, keywords or phrases representative of a recurring transaction, and/or the like), to have access to a particular folder of messages (e.g., a specific inbox), and/or the like. According to some implementations, the user may specify which information and/or the types of information that the transaction analysis platform may have access to and/or receive.

In some implementations, the transaction analysis platform may receive, from the user device, a preauthorization associated with the missed transaction prevention service that enables the user to configure the level of access and/or authorization provided to the transaction analysis platform. For example, the preauthorization may authorize the transaction analysis platform to execute any transactions that satisfy a threshold transaction amount set by the user. The preauthorization may identify specific merchant accounts and/or transaction accounts associated with the user that the transaction analysis platform may access. The preauthorization may allow the user to configure different levels of access and/or authorization for each merchant account and/or transaction account provided by the user. For example, a preauthorization may enable the transaction analysis platform to execute any transaction associated with a first merchant, to execute any transaction that satisfies a threshold transaction amount for a second merchant, to provide an alert to the user device of any transaction with a third merchant, and/or to not enable the transaction analysis platform to execute any transitions with a fourth merchant only if the user provides additional confirmation.

As described herein, the user may provide access information associated with accessing an account associated with the user, enabling monitoring and/or analyzing of transaction information associated with user transactions and/or the accounts, and/or executing transactions associated with the transaction account and/or the merchant account. In some implementations, upon installing an application on the user device (e.g., an application for missed transaction prevention), the application may request (e.g., via an authentication token) that the user authorize monitoring of the user's usage of the user device, characteristics of the user device, the user's transaction account, merchant account, and/or messaging account, and/or the like. Such a request may indicate to the user that the monitoring is for analyzing transaction-related activity of a user and executing an account transaction (e.g., a transaction from a transaction account associated with the user) to prevent a missed transaction. With an approval authorizing monitoring and/or analyzing of transaction information associated with user transactions, the application may monitor and/or analyze transaction information to identify a transaction pattern associated with a merchant account, to determine that the transaction pattern is associated with an upcoming transaction, to determine that the upcoming transaction is not scheduled for automatic execution, and/or to cause an account transaction associated with the upcoming transaction. In some implementations, the application may prompt the user to authorize monitoring and/or analyzing transaction information to prevent a missed transaction, as described herein. In some implementations, the application may not prompt the user to authorize monitoring and/or analyzing transaction information until a particular event has occurred (e.g., detection of a transaction, detection of a transaction pattern, detection of an upcoming transaction, receipt of a particular type of message, and/or the like), or may prompt the user to confirm a previous authorization when the particular event has occurred. The request and/or prompt may enable the user to opt out from being monitored by the application.

As further shown in FIG. 1A, and by reference number 120, the transaction analysis platform may monitor transactions associated with a transaction account of the user. The transaction analysis platform may monitor a transaction log, associated with the transaction account, provided by the transaction account platform. In some implementations, the transaction log may include every transaction executed that is associated with the transaction account. In some implementations, the transaction log may include a subset of the transactions executed that is associated with the transaction account.

As further shown in FIG. 1A, and by reference number 130, the transaction analysis platform may analyze the transaction log to detect a recurring transaction. The transaction analysis platform may detect recurring transactions by identifying a transaction pattern associated with a merchant account within the transaction log.

The transaction log may include transaction information, such as a transaction identifier, a date of execution, a merchant account identifier associated with the transaction, a transaction amount, and/or the like. The transaction analysis platform may identify the transaction pattern based on a plurality of historical transactions (e.g., past transactions included in the transaction log) that are associated with a specific merchant account.

The transaction pattern may be based on one or more pattern identifiers identified within the plurality of historical transactions, such as the plurality of historical transactions having the same transaction amount and/or a similar transaction amount (e.g., the differences in transaction amounts satisfy a threshold range), having a related date of execution and/or a similar date of execution (e.g., the date of execution occurs on the same and/or day each month, and/or the differences in date of executions satisfy a threshold range), having the same period of execution between subsequent transactions of the plurality of historical transactions (e.g., each of the plurality of historical transactions have the same and/or similar amount of time between date of executions, such one month between each of the plurality of historical transactions), and/or the like.

For example, the transaction log may include four transactions (e.g., historical transactions) associated with the merchant "ABC Co." The transactions may be identified as transaction "0003," "0025," "0050," and "0074." Transaction 0003 may have a date of execution of Jun. 19, 2019. Transaction 0025 may have a date of execution of Jul. 20, 2019. Transaction 0050 may have a date of execution of Aug. 22, 2019. Transaction 0074 may have a date of execution of Sep. 22, 2019. Each of the four transactions associated with ABC Co. may have the transaction amount of $39.99. The transaction analysis platform may identify a transaction pattern within these four transactions based on the four transactions having the same transaction amount ($39.99), having a related date of execution (each transaction was executed on a similar day of the month), and/or having a similar period of execution between each of the four transactions (each transaction occurred approximately one month apart).

The detection of recurring transactions may indicate that an upcoming transaction associated with the plurality of historical transactions may need to be executed between the transaction account of the user and an account associated with the merchant. For example, based on the example above, the transaction analysis platform may identify that an upcoming transaction is associated with ABC Co, the upcoming transaction has a transaction amount of $39.99, and/or the upcoming transaction has a transaction period which expires on and/or near Oct. 22, 2019.

In some implementations, the transaction analysis platform may pre-process the transactions to reduce the quantity of transactions that are further processed to detect recurring transactions, for example by identifying a characteristic of the transaction that indicates recurring activity, such as a description related to the transaction. The characteristics may include a source of the transactions (e.g., based on an identifier of a source of the transactions), whether the source is included on a list of sources (e.g., identified merchants having recurring transactions), a time and/or date on which the transactions were processed (e.g., designated and/or determined dates of transactions), a type of the transaction, a value of the transaction, other information indicating a recurring transaction, and/or the like. Accordingly, the transaction analysis platform may not process transactions to detect recurring transactions unless the transaction analysis platform identifies a likelihood of recurring transactions. In this way, the transaction analysis platform may conserve computing resources and/or network resources that would have otherwise been consumed by processing transactions that could have been filtered out as irrelevant.

Additionally, or alternatively, the transaction analysis platform may ignore transactions (e.g., transactions involving merchants that are not likely to be associated with recurring transactions, such as transactions that satisfy a threshold value, and/or the like). For example, the transaction analysis platform may identify transactions associated with a merchant that may be likely to be associated with recurring transactions by performing a lookup of an identifier associated with the merchant, by analyzing a repository of hundreds, thousands, or more transactions to determine if the merchant was involved in a same type of transaction associated with other transaction accounts of other users (e.g., indicating that the merchant may utilize recurring transactions), and/or the like.

Additionally, or alternatively, the transaction analysis platform may identify one or more fields of entries of the transaction log associated with the transaction account and may ignore transactions with entries that include particular combinations of identifiers of entities, identifiers of sources, values of the transactions, dates of the transactions, and/or the like. Such a technique conserves processing resources of the transaction analysis platform by reducing a quantity of transactions that the transaction analysis platform processes, by filtering out transactions that are unlikely to be recurring transactions, and/or the like.

In some implementations, the transaction analysis platform may process the transaction log using a combination of processing techniques (e.g., after pre-processing the transactions) to identify transactions that may be recurring. For example, the transaction analysis platform may process the transaction log using a text processing technique (e.g., a natural language processing technique, a text analysis technique, and/or the like), a code processing technique, and/or the like. In some implementations, the transaction analysis platform may process the transaction log using an image processing technique (e.g., a computer vision technique, an optical character recognition (OCR) technique, and/or the like to identify text corresponding to transactions of the transaction log).

In some implementations, when processing the transaction log using the text processing technique, the transaction analysis platform may process text of entries in the transaction log to identify terms, phrases, and/or the like included in the text (e.g., to identify recurring transactions included in the text, to extract information related to the recurring transactions, and/or the like). For example, the transaction analysis platform may process the text of the transactions to identify terms and/or phrases that may likely identify a recurring transaction.

In some implementations, when processing the transaction log using the code processing technique, the transaction analysis platform may process code associated with the transaction log to identify recurring transactions included in the transaction log, to identify information related to the recurring transactions, and/or the like. For example, the transaction analysis platform may analyze code (e.g., hypertext markup language (HTML) code, cascading style sheet (CSS) code, and/or the like) associated with the transaction log and/or transaction account platform, tags within the code (e.g., a div tag, an image tag, text-related tags, and/or the like) that are associated with the transactions, and/or the like.

In some implementations, by processing the code, tags within the code, and/or the like, the transaction analysis platform may be capable of identifying text within the transaction log. For example, the transaction analysis platform may be configured with information that identifies a hierarchy of the code associated with the transaction log (e.g., the code may be structured in a hierarchical manner that impacts execution of the code, tags associated with the code may have a hierarchical structure to organize entries of the transaction log in the code and/or to impact a manner in which the transaction log is provided for display, and/or the like).

In some implementations, the transaction analysis platform may scan the hierarchical structure of the code associated with a transaction log to identify recurring transactions, to identify information related to the transaction log (entries corresponding to transactions in the transaction log), and/or the like. For example, the transaction analysis platform may scan the hierarchical structure of the code to identify fields, entries, and/or text in the code. Continuing with the previous example, if the transaction analysis platform identifies a field in the code of the transaction, then the transaction analysis platform may scan the hierarchical structure (e.g., tags that are at a higher or lower level in the hierarchical structure) to identify information (e.g., text, metadata, an entry, and/or the like) that may be associated with the field. Continuing still with the previous example, the transaction analysis platform may process the information associated with the field to determine whether the field is associated with recurring transactions (e.g., using a text processing technique to identify terms, phrases, values, and/or the like included in the information that indicates that the field is a field of an entry for recurring transactions).

Additionally, or alternatively, the transaction analysis platform may be configured to communicate with the merchant platform via automated web-based interactions (e. g., web scraping), where one or more scripts may be created and utilized to automatically visit the merchant platform, input the access information to log into the user's merchant account, click various buttons and/or links on the website, and/or the like, to obtain the information related to the merchant account (such as billing information, transaction amount information, transaction period information, transaction due date information, and/or the like). The recurring transactions may be identified based on the information obtained via the automated web-based interactions.

As shown in FIG. 1B, and by reference number 140, the transaction analysis platform may obtain information associated with a transaction execution setting of the detected recurring transactions associated with a merchant account. The transaction execution setting may be related to whether the detected recurring transactions associated with the merchant account are designated for automatic execution (e.g., set to automatically execute each transaction period). In some implementations, the transaction analysis platform may obtain the information associated with the transaction execution setting based on detecting the recurring transactions associated with a merchant account, a date of execution of the recurring transactions, a setting associated with the merchant platform, and/or the like.

As shown by reference number 140a, the transaction analysis platform may receive online activity from the user device associated with the user. The online activity may be associated with an online account of the user, as described above. For example, the transaction analysis platform may be configured to monitor online activity of the user, such as the user accessing webpages using a browser (e.g., on the user device) to conduct merchant activity (e.g., execute transactions on a merchant platform, sign up for a merchant account, access information related to a merchant account on the merchant platform, access information related to a transaction account, and/or the like) with a merchant platform. Such online activity and/or similar online activity (e.g., social media activity, searches, sending messages, accessing media, accessing merchant platforms, and/or the like) involving merchant activity may indicate that the user has recurring transactions associated with a merchant account, is manually executing recurring transactions associated with a merchant account, is not visiting a merchant platform on a date of execution of one or more of the recurring transactions (e.g., indicating that the transaction was executed automatically), and/or the like. Similarly, in some implementations, other activity can be monitored (e.g., sending a message identifying recurring transaction information, accessing offline media associated with the recurring transaction information, and/or the like) to determine the execution setting associated with the recurring transactions.

In some implementations, online activity may include information obtained via automated web-based interactions (e. g., web scraping), as described above. After receiving preauthorization to access a merchant account, as described above, the transaction analysis platform may utilize automated web-based interactions to visit a merchant platform associated with a merchant, navigate the platform to access merchant account information associated with the user, and/or determine, from the merchant account information associated with the user, the execution setting associated with the merchant account.

In some implementations, the online activity may be monitored on the user device associated with the user. For example, the online activity may be monitored via an application running on the user device and/or an application (e.g., an applet, an application programming interface, a plug-in, a browser extension, and/or the like) installed on a browser of the user device. The online activity may be monitored using any suitable techniques, such as scraping hypertext markup language (HTML) associated with the online activity, capturing search strings associated with the online activity, and/or the like.

In some implementations, the user device may conduct merchant activity (such as execute a transaction, register for a merchant account associated with the user, purchase a good and/or service provided by the merchant associated with the merchant platform, and/or the like) with the merchant platform. In some implementations, the merchant platform may provide transaction information (e.g., recurring transaction related information, such as a transaction amount, a transaction date of execution, an upcoming transaction due date, an execution setting related to the recurring transactions, an execution period relating to the recurring transactions, and/or the like) to the messaging platform in the form of a message, as described below. Additionally, or alternatively, the merchant platform may provide the transaction information directly to the transaction analysis platform.

As further shown in FIG. 1B, and by reference number 140b, the transaction analysis platform may analyze messages to identify recurring transaction information, such as the execution setting of recurring transactions associated with a merchant account. As shown, the transaction analysis platform may access a messaging account (e.g., a messaging account maintained by the messaging platform) of the user and process the messages in the messaging account (e.g., messages that are maintained and/or stored by the messaging platform). For example, the transaction analysis platform may process the messages to identify recurring transaction information. As used herein, recurring transaction information may include one or more keywords indicating an execution setting of a transaction (such as automatic, autopay, regular, predetermined, scheduled, and/or the like), information relating to a date of execution associated with recurring transactions, information relating to an execution amount associated with recurring transactions, information relating to an execution period associated with recurring transactions, and/or the like. For example, the recurring transaction information may include transaction confirmation messages from a merchant, inquiries sent to a merchant relating to a merchant account associated with the user, and/or the like.

As used herein, a message that includes recurring transaction information is referred to as a "recurring transaction related message." In some implementations, the transaction analysis platform may process hundreds, thousands, or more messages in hundreds, thousands, or more messaging accounts associated with hundreds, thousands, or more users. Accordingly, the transaction analysis platform may perform one or more rigorous computerized processes to process the messages of the messaging account.

In some implementations, the transaction analysis platform may pre-process the messages to reduce the quantity of messages that are further processed to identify recurring transaction related messages, for example by identifying a characteristic of the message that suggests a message related to recurring transactions. The characteristic may correspond to a source of the message (e.g., domain name of a source of the message, whether the source is included on a list of sources (e.g., a list of merchant platforms and/or the like), and/or the like), a folder into which the message has been filtered by the messaging platform (e.g., an inbox, a promotions folder, a spam folder, a customized folder, and/or the like), a time and/or date on which the message was received, and/or the like. Accordingly, the transaction analysis platform may not process messages to identify a recurring transaction related message unless the transaction analysis platform identifies a likelihood that the messages include recurring transaction related information. In this way, the transaction analysis platform may conserve computing resources and/or network resources that may have otherwise been consumed by processing messages that are not related to recurring transactions and that could have been filtered out as irrelevant.

Additionally, or alternatively, the transaction analysis platform may ignore messages (e.g., from third parties that are not likely to be associated with recurring transaction related information, such as personal messages, newsletters, and/or the like). For example, the transaction analysis platform may identify messages associated with a third party that may be likely to be associated with a recurring transaction related message by performing a lookup of a domain name associated with a message, by analyzing a repository of hundreds, thousands, or more messages to determine if the same type of message was sent to other messaging accounts (e.g., indicating that the message may be related to recurring transactions), by performing a lookup of a portion of a source identifier (e.g., a user identifier before the "@" symbol in an email address), and/or the like. Additionally, or alternatively, and as another example, the transaction analysis platform may analyze historical messages associated with a folder and determine a theme for the folder and may ignore messages in that folder (e.g., a folder with a personal theme, a promotional theme, and/or the like) and/or process the messages in that folder (e.g., a recurring transaction-related folder, a bill paying folder, a transaction folder, a receipt folder, and/or the like) based on the theme.

Additionally, or alternatively, the transaction analysis platform may identify terms and/or phrases included in a subject line and/or in a body of a message and may ignore messages that include particular combinations of terms and/or phrases. Additionally, or alternatively, and as another example, the transaction analysis platform may ignore duplicate messages (e.g., messages that have the same header, the same body, the same unique identifier, and/or the like). Such a technique conserves processing resources of the transaction analysis platform by reducing a quantity of messages that the transaction analysis platform may be required to process, by filtering messages that are unlikely to be recurring transaction related messages, and/or the like.

In some implementations, the transaction analysis platform may process the messages using a combination of processing techniques (e.g., after pre-processing the messages) to identify messages that may be recurring transaction related messages. For example, the transaction analysis platform may process the messages using an image processing technique (e.g., a computer vision technique, an optical character recognition (OCR) technique, etc.), a text processing technique (e.g., a natural language processing technique, a text analysis technique, etc.), a code processing technique, and/or the like.

In some implementations, when processing the messages using the image processing technique, the transaction analysis platform may process images associated with the messages. In some implementations, the transaction analysis platform may identify that a message includes an image by detecting that the message includes an image as an attachment (e.g., based on a file type of the attachment), by detecting an image in a body of the message (e.g., as compared to detecting text in the body of the message), by processing code associated with the message to detect an image (e.g., by detecting an image tag in code of an email or by detecting a unique resource identifier for an image included in the code), and/or the like. In some implementations, the transaction analysis platform may process the image to identify a term, a phrase, a logo, a symbol, and/or the like included in the image. For example, the transaction analysis platform may process the image using OCR to identify recurring transaction related information included in the image, a merchant associated with the recurring transaction related information, and/or the like.

Additionally, or alternatively, the transaction analysis platform may capture an image of the body of a message (e.g., text and images included in the body of the message), such as by saving a copy of the message as a portable data format (PDF) document or by capturing an image of the message, and may process the image in a similar manner (e.g., to identify terms, phrases, logos, and/or the like included in the image of the body of the message). For example, the transaction analysis platform may capture an image of text of the message, images included in the message, and/or the like and may process the image to identify recurring transaction related information included in the message, to extract information related to the recurring transactions from the message, and/or the like.

In some implementations, when processing the messages using the text processing technique, the transaction analysis platform may process text of the messages to identify terms, phrases, and/or the like included in the text (e.g., to identify recurring transactions included in the text, to extract information related to the recurring transactions, and/or the like). For example, the transaction analysis platform may process the text of the messages to identify terms, phrases, and/or context (e.g., using natural language processing) that may likely be related to recurring transaction related information, that identify a merchant (e.g., a merchant associated with the recurring transactions) with which recurring transactions are likely to be associated, and/or the like.

In some implementations, when processing the messages using the code processing technique, the transaction analysis platform may process code associated with the messages to identify recurring transaction related information included in the messages, to identify information related to the recurring transaction related information, and/or the like. For example, the transaction analysis platform may analyze code (e.g., hypertext markup language (HTML) code, cascading style sheet (CSS) code, and/or the like) associated with messages, tags within the code (e.g., a div tag, an image tag, text-related tags, and/or the like) that are associated with the messages, and/or the like.

In some implementations, by processing the code, tags within the code, and/or the like, the transaction analysis platform may be capable of identifying text within a message, images within the message, and/or the like that indicate a likelihood that the message is associated with recurring transaction related information. For example, the transaction analysis platform may be configured with information that identifies a hierarchy of the code associated with the message (e.g., the code may be structured in a hierarchical manner that impacts execution of the code, tags associated with the code may have a hierarchical structure to organize information in the code and/or to impact a manner in which the information is provided for display, and/or the like). In some implementations, the transaction analysis platform may scan the hierarchical structure of the code associated with a message to identify recurring transaction related information included in the message, to identify information related to the message, and/or the like. For example, the transaction analysis platform may scan the hierarchical structure of the code to identify text and/or images included in the code. Continuing with the previous example, if the transaction analysis platform identifies an image in the code of the message, then the transaction analysis platform may scan the hierarchical structure (e.g., tags that are at a higher or lower level in the hierarchical structure) to identify information (e.g., text, metadata, etc.) that may be associated with the image. Continuing still with the previous example, the transaction analysis platform may process the information associated with the image to determine whether the image includes recurring transaction related information (e.g., using a text processing technique to identify terms, phrases, and/or the like included in the information that indicates that the image includes recurring transaction related information).

In some implementations, the transaction analysis platform may obtain one or more template recurring transaction related messages that are associated with one or more merchants known to send recurring transaction related messages. The transaction analysis platform may store the one or more template recurring transaction related messages in a data structure to enable the transaction analysis platform to use the one or more template recurring transaction related messages to process the messages of the messaging account. Accordingly, the transaction analysis platform may obtain, from the data structure, the one or more template recurring transaction related messages and use the one or more template recurring transaction related messages to process the messages of the messaging account (e.g., by ignoring messages that do not follow the template(s) and/or recognizing recurring transaction related information in messages that do follow the template(s)).

Accordingly, the transaction analysis platform may train a message analysis model based on one or more parameters associated with identifying recurring transaction related information in one or more messages, such as a format of a recurring transaction related message, a template of a recurring transaction related message, an image associated with a recurring transaction related message, a field (e.g., a date field, a time field, an execution amount field, an execution setting field, and/or the like) associated with a recurring transaction related message, a type of a recurring transaction related message (e.g., a notification message, a confirmation message, a receipt, and/or the like), a merchant associated with a recurring transaction related message, an attachment associated with a recurring transaction related message, and/or the like. The transaction analysis platform may train the message analysis model using historical data associated with identifying recurring transaction related information within messages according to the one or more parameters. Using the historical data and the one or more parameters as inputs to the message analysis model, the transaction analysis platform may determine that a message is a recurring transaction related message or that a message is not a recurring transaction related message in order to determine whether a messaging account includes a recurring transaction related message associated with recurring transaction related information. The message analysis model may be one or more machine learning models trained to identify recurring transaction related information in one or more messages. The one or more machine learning models may be trained and/or used in a manner similar to that described below with respect to FIGS. 2 and 3.

As further shown in FIG. 1B, and by reference number 140c, the transaction analysis platform may receive transaction specific information from the transaction account platform. The transaction specific information may include the information contained within a transaction log associated with a transaction account of a user, as described above. The transaction specific information may include information relating to historical transactions. The transaction specific information may include transaction amounts of transactions included in the transaction specific information, information identifying merchants associated with transactions included in the transaction specific information, information identifying dates of execution of transactions included in the transaction specific information, and/or the like.

In some implementations, the transaction account platform may provide the transaction specific information in real time (e.g., the transaction account platform may provide transaction specific information to the transaction analysis platform as the transactions are executed). In some implementations, the transaction account platform may provide updated transaction specific information when prompted by the user. In some implementations, the transaction account platform may provide the transaction specific information periodically and/or in batches.

In some implementations, the transaction specific information may include a transaction account setting related to the transaction specific information. The transaction account setting may be whether one or more historical transactions are designated for automatic execution (such as automatic bill pay and/or the like), whether all historical transactions (and/or future transactions) associated with a merchant are designated for automatic execution, and/or the like. The transaction account setting may be received and/or stored by the transaction account platform. The transaction analysis platform may receive the transaction account setting from the transaction account platform. Additionally, or alternatively, the transaction analysis platform may receive the transaction account setting from the user device. If the transaction analysis platform identifies that a transaction account setting indicates that one or more historical transactions are designated for automatic execution, the transaction analysis platform may not perform additional analysis related to determining whether the one or more historical transactions are designated for automatic execution (such as analysis described with respect to FIG. 1C). As such, the transaction analysis platform may pre-process historical transactions prior to determining whether the historical transactions are designated for automatic execution. In this way, the transaction analysis platform may conserve computing resources and/or network resources that would have otherwise been used to determine if the one or more historical transactions are designated for automatic execution.

The transaction analysis platform may obtain information associated with the transaction execution setting of recurring transactions. The transaction analysis platform may use online activity associated with the user device of the user, recurring transaction information associated with a merchant account, message analysis of messages received by the messaging platform, transaction specific information received from the transaction account platform, and/or the like to determine the execution setting of the recurring transactions. In this way, the transaction analysis platform may gather a plurality of recurring transaction related information associated with the user to determine the execution setting of the recurring transactions.

As shown in FIG. 1C, and by reference number 150*a*, the transaction analysis platform may determine that the recurring transactions have not been designated to be automatically executed. The transaction analysis platform may determine that the execution setting of the recurring transactions is not automatic based on the information obtained as described above with respect to FIG. 1B. In some implementations, the transaction analysis platform may determine that a historical transaction of the plurality of historical transactions associated with the recurring transactions was not designated for automatic execution.

Typically, recurring transactions designated for automatic execution have the same and/or related execution amounts, dates of execution, and/or periods of execution between each of the transactions of the plurality of historical transactions. The transaction analysis platform may determine that the recurring transactions have not been automatically executed based on the transaction pattern identified, as described above. For example, the transaction analysis platform may determine that the plurality of historical transactions do not have related dates of execution (e.g., the dates of execution for each of the plurality of historical transactions are all on different days of the month), do not have similar transaction amounts, and/or do not have related periods of execution between each of the transactions of the plurality of historical transactions. The transaction analysis platform may designate a threshold amount and/or value to satisfy to determine if the recurring transactions have been designated for automatic execution. For example, the transaction analysis platform may determine that recurring transactions have not been designated for automatic execution if the dates of execution for each of the plurality of historical transactions do not satisfy a threshold date (for example, if the dates of execution for each of the plurality of historical transactions are not one of the same 3 days each month (e.g., if the dates of execution for each of the plurality of historical transactions do not occur between the first and the third of each month)). In some implementations, the transaction analysis platform may determine that the recurring transactions have not been automatically executed based on a subset of the plurality of historical transactions corresponding to the recurring transactions.

In some implementations, the transaction analysis platform may determine that a historical transaction of the plurality of historical transactions associated with the recurring transactions was not designated for automatic execution. The transaction analysis platform may determine that that the recurring transactions are not designated to be automatically executed based on the determination that the single historical transaction of the plurality of historical transactions was not designated for automatic execution. In some implementations, the single historical transaction of the plurality of historical transactions is a most recent transaction associated with the merchant account in the transaction log.

The transaction analysis platform may determine that recurring transactions associated with a merchant account of the user are not designated for automatic execution based on a user input that indicates whether the merchant account is associated with automatic execution. In some implementations, the transaction analysis platform may determine that recurring transactions associated with a merchant account of the user are not designated for automatic execution based on information received from the messaging platform and/or the merchant platform. For example, the transaction analysis platform may determine that recurring transactions associated with a merchant account of the user are not designated for automatic execution based on a message from the merchant associated with the merchant account that does not include a keyword (such as automatic, auto-pay, regular, predetermined, scheduled, and/or the like) indicating that the merchant account is designated for automatic execution.

In some implementations, the transaction analysis platform may determine that recurring transactions associated with a merchant account of the user are not designated for automatic execution based on metadata associated with one or more of the plurality of historical transactions associated with the recurring transactions. In some implementations, the transaction analysis platform analyzes the metadata of the most recent historical transaction of the plurality of historical transactions. In some implementations, the transaction analysis platform analyzes the metadata of a subset of the plurality of historical transactions.

The transaction analysis platform may determine that, based on determining that the historical transaction is not designated for automatic execution, that an execution of an upcoming transaction (e.g., the next transaction due associated with the plurality of historical transactions) is not scheduled. For example, the transaction analysis platform may determine that a plurality of historical transactions correspond to merchant ABC Co. and the transactions are made monthly (the transaction period). For this example, assume the date today is Oct. 1, 2019. The transaction analysis platform may determine that the historical transaction corresponding to the month of September was not designated to be automatically executed. The transaction analysis platform may determine that, based on the transaction pattern identified as described above, that an upcoming transaction is due in the month of October. The transaction analysis platform may determine that, based on determining that the historical transaction corresponding to the month of September was not designated to be automatically executed, the upcoming transaction corresponding to the month of October is not scheduled to be automatically executed.

As shown by reference number 160*a*, the transaction analysis platform may utilize a machine learning model to determine whether recurring transactions are designated for automatic execution. The transaction analysis platform may use one or more machine learning models such as one or more machine learning models described with regard to FIGS. 2 and 3 or one or more machine learning models trained in a manner similar to that described with regard to FIGS. 2 and 3.

As further shown in FIG. 1C, and by reference number 170*a*, the transaction analysis platform may cause the transaction backend system to execute an upcoming transaction associated with the recurring transaction. The transaction analysis platform may determine a transaction amount associated with the upcoming transaction, a transaction period for the upcoming transaction (e.g., when the transaction must be completed to avoid a missed transaction), a merchant associated with the upcoming payment, a transaction account associated with the user and the upcoming payment, and/or the like.

The transaction analysis platform may determine that the upcoming transaction includes a transfer of funds between a transaction account associated with the user and a merchant account associated with the merchant (e.g., a transaction account associated with the merchant). The transaction analysis platform may cause, based on the determination that the upcoming transaction is not scheduled to be automatically executed and before the expiration of the transaction period associated with the upcoming transaction passes, the upcoming transaction to be automatically executed.

The transaction analysis platform may determine that a status (e.g., amount of funds within the account, line of credit available to the account, a setting of the account, an expiration date of the account, and/or the like) of the transaction account of the user satisfies a threshold for performing the upcoming transaction. For example, the threshold may relate to the transaction amount of the upcoming transaction. The transaction analysis platform may, based on determining that the status of the transaction account of the user satisfies the threshold for performing the upcoming transaction, cause the upcoming transaction to be automatically executed using resources (e.g., funds, credit, and/or the like) associated with the transaction account of the user.

The transaction analysis platform may, based on determining that the status of the transaction account of the user does not satisfy the threshold, request a different transaction account associated with the user to execute the transaction. The different transaction account may be provided by the user when the user registers for and/or provides preauthorization to the transaction analysis platform. The transaction analysis platform may, based on determining that the status of the transaction account of the user does not satisfy the threshold, prompt the user to identify a different transaction account, urgently notify the user via the user device, execute the transaction with the different transaction account, and/or the like.

The transaction analysis platform may cause the upcoming transaction to be automatically executed by scheduling an execution of a transaction corresponding to the upcoming transaction. The scheduling of the execution of the transaction may be based on the transaction period of the upcoming transaction. For example, the transaction analysis platform may schedule the execution of the transaction before the transaction period passes. In this way, the transaction analysis platform ensures that the upcoming transaction will not become a missed transaction.

The transaction analysis platform may cause the upcoming transaction to be automatically executed by designating a transaction corresponding to the upcoming transaction for automatic execution. The transaction analysis platform may designate the transaction corresponding to the upcoming transaction for automatic execution by communicating with the user device and/or the merchant platform. In some implementations, the transaction analysis platform may designate the transaction corresponding to the upcoming transaction for automatic execution via automated web-based interactions. In some implementations, the transaction analysis platform may designate the transaction corresponding to the upcoming transaction for automatic execution by prompting the user to perform an interaction using the user device which causes the transaction associated with the upcoming transaction to be designated for automatic execution. In some implementations, the transaction analysis platform requests confirmation from the user prior to designating the transaction corresponding to the upcoming transaction for automatic execution. The request for confirmation may include a request to designate a transaction account to be associated with the transaction corresponding to the upcoming transaction.

The transaction analysis platform may cause the upcoming transaction to be automatically executed by executing, via the transaction back end system, a transaction with the merchant account that corresponds to the upcoming transaction. In some implementations, executing the transaction with the merchant account that corresponds to the upcoming transaction includes transferring resources from a transaction account associated with the user to a transaction account associated with the merchant. The execution of the transaction corresponding to the upcoming transaction may be based on a characteristic (such as transaction amount, date of execution, merchant transaction account information, and/or the like) of the plurality of historical transactions corresponding to the upcoming transaction.

The transaction analysis platform may create a transaction entry that corresponds to the transaction corresponding to the upcoming transaction in the transaction log. For example, after, or at the same time, as executing the transaction corresponding to the upcoming transaction, the transaction analysis platform may create a new entry, or cause a new entry to be created, in the transaction log of the transaction account associated with the user.

The transaction analysis platform may send a notification to the user device of the user to indicate that the transaction corresponding to the upcoming transaction has been executed. The notification may include transaction information (such as transaction amount, date of execution, merchant associated with the transaction, and/or the like).

The transaction analysis platform may, before causing the transaction corresponding to the upcoming transaction to be executed, request the user to authorize the transaction. The transaction analysis platform may execute the transaction based on the user providing authorization to perform the transaction.

The transaction analysis platform may cause the transaction corresponding to the upcoming transaction to be executed in conjunction with the transaction backend system. The transaction analysis platform may communicate with the transaction backend system. The transaction backend system may communicate with the merchant account platform to execute the transaction. The merchant account platform may contain transaction account information related to the transaction account of the merchant. The transaction analysis platform may transmit a request to the transaction backend system to execute a transaction. The transaction backend system may be associated with a service provider. The service provider may be a financial institution, a mobile payment company, and/or the like.

The transaction backend system may store transaction account information (such as transaction account identifier information, user information, device information, and/or the like) related to the service provider. The transaction account information may be associated with an account corresponding to the user and/or the merchant. For example, when a user registers for a transaction account with the service provider, the transaction account information may be provided by or to the user and associated with the transaction account of the user. The transaction account information may be stored by the transaction backend system.

The transaction backend system may receive the request from the transaction analysis platform to execute the transaction. The request from the transaction analysis platform may include user information (such as user device information, user transaction account identifier information, user login information, and/or the like). The request from the transaction analysis platform may include merchant information (such as merchant platform information, merchant transaction account identifier information, and/or the like). In some implementations, the communication between the transaction analysis platform and the transaction backend system is secure (e.g., encrypted).

The transaction backend system may execute the transaction requested by the transaction analysis platform in response to receiving the request transmitted by the transaction analysis platform. The transaction backend system may communicate with the transaction analysis platform and/or the user device if the transaction backend system is unable to execute the transaction. For example, the transaction backend system may require additional information to execute the transaction. The transaction backend system may transmit a request to transaction analysis platform for the additional information required. For example, the transaction backend system may search for a transaction account associated with the user and/or the merchant. If the transaction backend system is unable to locate a transaction account associated with the user and/or the merchant, the transaction backend system may transmit a message to the transaction analysis platform that no transaction account was found that was associated with the user and/or the merchant.

The transaction backend system may alert or notify the user if the transaction backend system is unable to execute the transaction. The transaction backend system may alert the user by sending a message to the user device indicating that the transaction backend system is unable to execute the transaction. The message to the user device may indicate one or more actions the user may perform (e.g., via the user device and/or the like) to complete the transaction (e.g., steps to complete the transaction, a platform to access to complete the transaction, information required to complete the transaction, and/or the like).

As further shown in FIG. 1C, and by reference number 150b, the transaction analysis platform may determine that the recurring transaction is designated to be automatically executed. The transaction analysis platform may determine that the recurring transaction is designated to be automatically executed in a manner similar to that as described above with respect to FIGS. 1A-1C, such as with respect to reference number 150a. The transaction analysis platform may determine that the recurring transaction is designated to be automatically executed based on a user input received by the transaction analysis system.

As shown by reference number 160b, the transaction analysis platform may utilize a machine learning model to determine whether recurring transactions are designated for automatic execution. The transaction analysis platform may use one or more machine learning models such as one or more machine learning models described with regard to FIGS. 2 and 3 or one or more machine learning models trained in a manner similar to that described with regard to FIGS. 2 and 3.

As shown by reference number 170b, the transaction analysis platform may verify that an upcoming transaction associated with the recurring transactions designated for automatic execution is likely to be processed and/or is capable of being processed. For example, the transaction analysis platform may determine that the status of the transaction account of the user satisfies a threshold for performing the upcoming transaction. For example, the threshold may relate to the transaction amount of the upcoming transaction. The transaction analysis platform may, based on determining that the status of the transaction account of the user satisfies the threshold for performing the upcoming transaction, verify that the upcoming transaction is likely to be automatically executed using resources (e.g., funds, credit, and/or the like) associated with the transaction account of the user.

The transaction analysis platform may communicate with the merchant account platform to verify that the upcoming transaction associated with the recurring transactions designated for automatic execution is likely to be processed and/or is capable of being processed. The transaction analysis platform may confirm that the merchant account platform includes all the required information (such as transaction account information, transaction information, and/or the like) to execute the upcoming transaction. In some implementations, the transactions analysis platform may confirm information that may prevent a transaction from occurring (such as expiration date, amount of resources available, and/or the like) related to the transaction account associated with the user stored in the merchant account platform.

The transaction analysis platform may, based on not verifying that the upcoming transaction is likely to be automatically executed, urgently notify the user via the transaction analysis platform and/or the user device. Additionally, or alternatively, the transaction analysis platform may use a different transaction account associated with the user to execute the upcoming transaction associated with the recurring transactions designated for automatic execution. The transaction analysis platform may determine transaction account information related to the different transaction account in a manner similar to that as described above.

In this way, the transaction analysis platform conserves computing resources of the user device and/or network resources that would have been otherwise used to locate a merchant platform (e.g., an application, a website, and/or the like) associated with the execution of the upcoming transaction, determine the transaction period, determine the transaction amount, provide information associated with the transaction account associated with the user to the merchant platform, and/or request or initiate a transaction from the transaction account to complete the upcoming transaction. Additionally, some implementations described herein may enable the transaction analysis platform to execute the upcoming transaction before the user misses the upcoming transaction (e.g., does not execute the upcoming transaction and/or does not executed the upcoming transaction within the transaction period). As a result, the transaction analysis platform conserves computing resources of the user device and/or network resources that would have otherwise been used to identify the missed transaction, investigate the missed transaction, execute the missed transaction, and/or contact the merchant associated with the missed transaction. The merchant associated with the missed transaction may conserve computing resources and/or network resources that would have otherwise been used to identify, detect, investigate, execute, and/or remedy the missed transaction.

As indicated above, FIGS. 1A-1C are provided as one or more examples. Other examples may differ from what is described with regard to FIGS. 1A-1C. The number and arrangement of devices and/or platforms shown in FIGS. 1A-1C are provided as one or more examples. In practice, there may be additional devices and/or platforms, fewer devices and/or platforms, different devices and/or platforms, or differently arranged devices and/or platforms than those shown in FIGS. 1A-1C. Furthermore, two or more devices and/or platforms shown in FIGS. 1A-1C may be implemented within a single device and/or platform, or a single device and/or platform shown in FIGS. 1A-1C may be implemented as multiple, distributed devices and/or platforms. Additionally, or alternatively, a set of devices and/or platforms (e.g., one or more device and/or platform) of FIGS. 1A-1C may perform one or more functions described as being performed by another set of devices and/or platforms of FIGS. 1A-1C.

Figure 2:
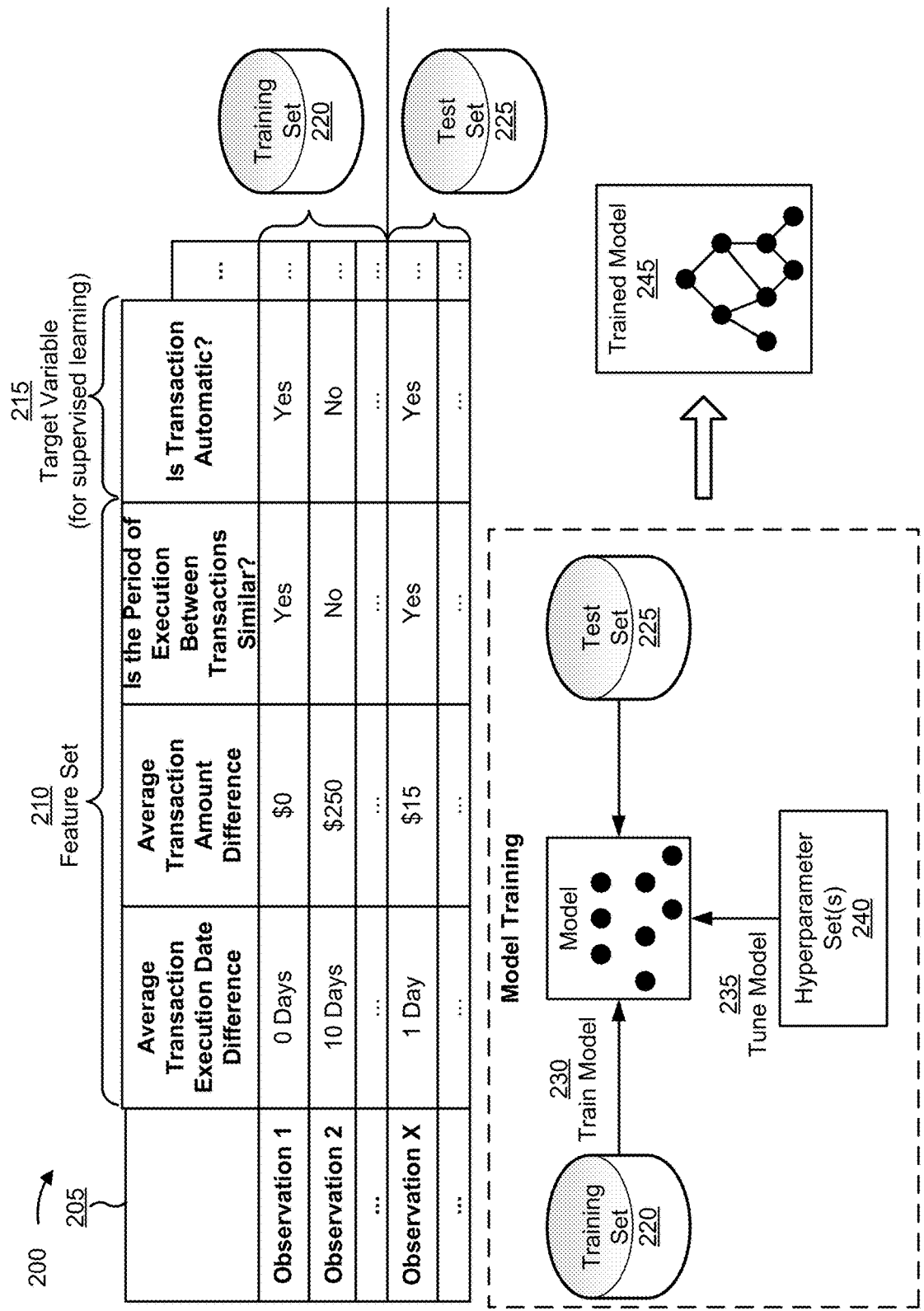
FIGS. 2 and 3 are diagrams of another one or more example implementations described herein.

FIG. 2 is a diagram illustrating an example 200 of training a machine learning model. The machine learning model training described herein may be performed using a machine learning system. The machine learning system may include a computing device, a server, a cloud computing environment, and/or the like, such as a transaction analysis platform, a user device, a server device, and/or a transaction backend system.

As shown by reference number 205, a machine learning model may be trained using a set of observations. The set of observations may be obtained and/or input from historical data, such as data gathered during one or more processes described herein. For example, the set of observations may include data gathered from user interaction with and/or user input to determine if a transaction is designated for automatic execution, as described elsewhere herein. In some implementations, the machine learning system may receive the set of observations (e.g., as input) from the transaction analysis platform, the user device, the server device, and/or the transaction backend system.

As shown by reference number 210, a feature set may be derived from the set of observations. The feature set may include a set of variable types. A variable type may be referred to as a feature. A specific observation may include a set of variable values corresponding to the set of variable types. A set of variables values may be specific to an observation. In some cases, different observations may be associated with different sets of variable values, sometimes referred to as feature values. In some implementations, the machine learning system may determine variable values for a specific observation based on input received from the transaction analysis platform, the user device, the server device, and/or the transaction backend system. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from the transaction analysis platform, the user device, the server device, and/or the transaction backend system, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of an average transaction execution date difference (e.g., the average difference between the date of execution (for example, the day of the month) of a plurality of historical transactions corresponding to the transaction), a second feature of an average transaction amount difference (e.g., the average difference between each transaction amount of each of the plurality of historical transactions corresponding to the transaction), a third feature of whether the period of execution between historical transactions is similar (the determination of whether the period of execution between each historical transaction of the plurality of historical transactions is similar may be based on whether the average period of execution between historical transactions satisfies a threshold), and so on. As shown, for a first observation, the first feature may have a value of "0 days," the second feature may have a value of "$0" (e.g., each of the plurality of historical transactions had the same transaction amount), the third feature may have a value of "Yes," and so on. These features and feature values are provided as examples, and may differ in other examples. For example, the feature set may include one or more of the following features: whether an input from a user has been received indicating the transaction is designated for automatic execution; whether a transaction pattern has been identified indicating one or more historical transactions corresponding to the transaction was designated for automatic execution; whether one or more keywords indicating the transaction is designated for automatic execution has been identified; whether the type of good and/or service associated with the transaction is one which has been identified as being associated with automatic execution (such as a mortgage transaction, a lease transaction, a utility transaction, and/or the like); whether the date of execution of historical transactions corresponding to the transaction are related; and/or the like. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory, and/or the like) used to train the machine learning model.

As shown by reference number 215, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values. As shown in FIG. 2, the target variable may correspond to whether a transaction is automatic (e.g., designated for automatic execution).

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit, tune, and/or the like) the machine learning model, while the test set 225 may be used to evaluate a machine learning model that is trained using the training set 220. For example, for supervised learning, the training set 220 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used, based on randomly generating hyperparameter values, and/ or the like). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups, based on randomly selecting a number of groups, and/or the like) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k–1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, closest to a desired threshold, and/or the like) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 3:
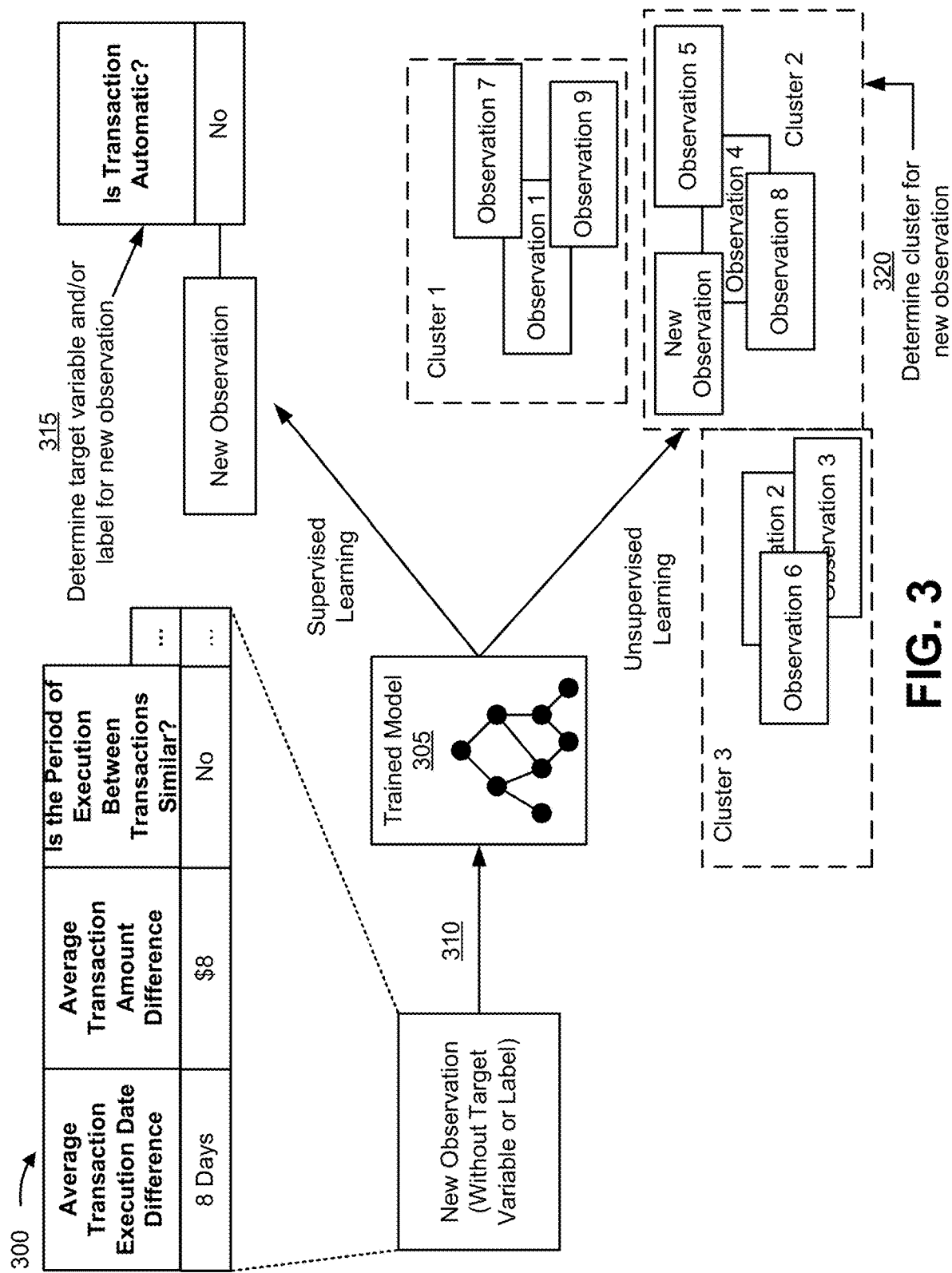

FIG. 3 is a diagram illustrating an example 300 of applying a trained machine learning model to a new observation. The new observation may be input to a machine learning system that stores a trained machine learning model 305. In some implementations, the trained machine learning model 305 may be the trained machine learning model 245 described above in connection with FIG. 2. The machine learning system may include a computing device, a server, a cloud computing environment, and/or the like, such as a transaction analysis platform, a user device, a server device, and/or a transaction backend system.

As shown by reference number 310, the machine learning system may receive a new observation (or a set of new observations), and may input the new observation to the machine learning model 305. As shown, the new observation may include a first feature of an average transaction execution date difference (e.g., the average difference between the date of execution (for example, the day of the month) of a plurality of historical transactions corresponding to the transaction), a second feature of an average transaction amount difference (e.g., the average difference of the value of each of historical transaction of the plurality of historical transactions corresponding to the transaction), a third feature of whether the period of execution between historical transactions is similar (the determination of whether the period of execution between each historical transaction of the plurality of historical transactions is similar may be based on whether the average period of execution between historical transactions satisfies a threshold), and so on, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observations and one or more prior observations (e.g., which may have previously been new observations input to the machine learning model and/or observations used to train the machine learning model), and/or the like, such as when unsupervised learning is employed.

In some implementations, the trained machine learning model 305 may predict a value of "No" for the target variable of whether the transaction is automatic (e.g., designated for automatic execution) for the new observation, as shown by reference number 315. Based on this prediction (e.g., based on the value having a particular label/classification, based on the value satisfying or failing to satisfy a threshold, and/or the like), the machine learning system may provide a recommendation, such as to execute the transaction, to execute the transaction before a transaction period associated with the transaction passes, to schedule the transaction to be executed, and/or the like. Additionally, or alternatively, the machine learning system may perform an automated action and/or may cause an automated action to be performed (e.g., by instructing another device to perform the automated action), such as automatically executing the transaction, automatically executing the transaction before the transaction period associated with the transaction passes, scheduling the transaction to be executed, and/or the like. As another example, if the machine learning system were to predict a value of "Yes" for the target variable of whether the transaction is automatic (e.g., designated for automatic execution), then the machine learning system may provide a different recommendation (e.g., to provide a reminder related to the transaction, to no longer track and/or process future transactions associated with the transaction, and/or the like) and/or may perform or cause performance of a different automated action (e.g., to verify that a transaction account associated with the transaction is capable of executing the transaction, and/or the like). In some implementations, the recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like.

In some implementations, the trained machine learning model 305 may classify (e.g. cluster) the new observation in a particular cluster, as shown by reference number 320. The observations within a cluster may have a threshold degree of similarity. Based on classifying the new observation in the particular cluster, the machine learning system may provide a recommendation, such as to execute the transaction, to execute the transaction before a transaction period associated with the transaction passes, to schedule the transaction to be executed, and/or the like. Additionally, or alternatively, the machine learning system may perform an automated action and/or may cause an automated action to be performed (e.g., by instructing another device to perform the automated action), such as automatically executing the transaction, automatically executing the transaction before the transaction period associated with the transaction passes, scheduling the transaction to be executed, and/or the like. As another example, if the machine learning system were to classify the new observation in a different cluster, then the machine learning system may provide a different recommendation (e.g., to provide a reminder related to the transaction, to no longer track and/or process future transactions associated with the transaction, and/or the like) and/or may perform or cause performance of a different automated action (e.g., to verify that a transaction account associated with the transaction is capable of executing the transaction, and/or the like).

In this way, the machine learning system may apply a rigorous and automated process to determine whether a transaction is automatic (e.g., designated for automatic execution). The machine learning system enables recognition and/or identification of tens, hundreds, thousands, or millions of features and/or feature values for tens, hundreds, thousands, or millions of observations, thereby increasing an accuracy and consistency of determining whether a transaction is automatic (e.g., designated for automatic execution) relative to requiring computing resources to be allocated for tens, hundreds, or thousands of operators to manually determine whether a transaction is automatic (e.g., designated for automatic execution) using the features or feature values.

As indicated above, FIG. 3 is provided as an example. Other examples may differ from what is described in connection with FIG. 3.

Figure 4:
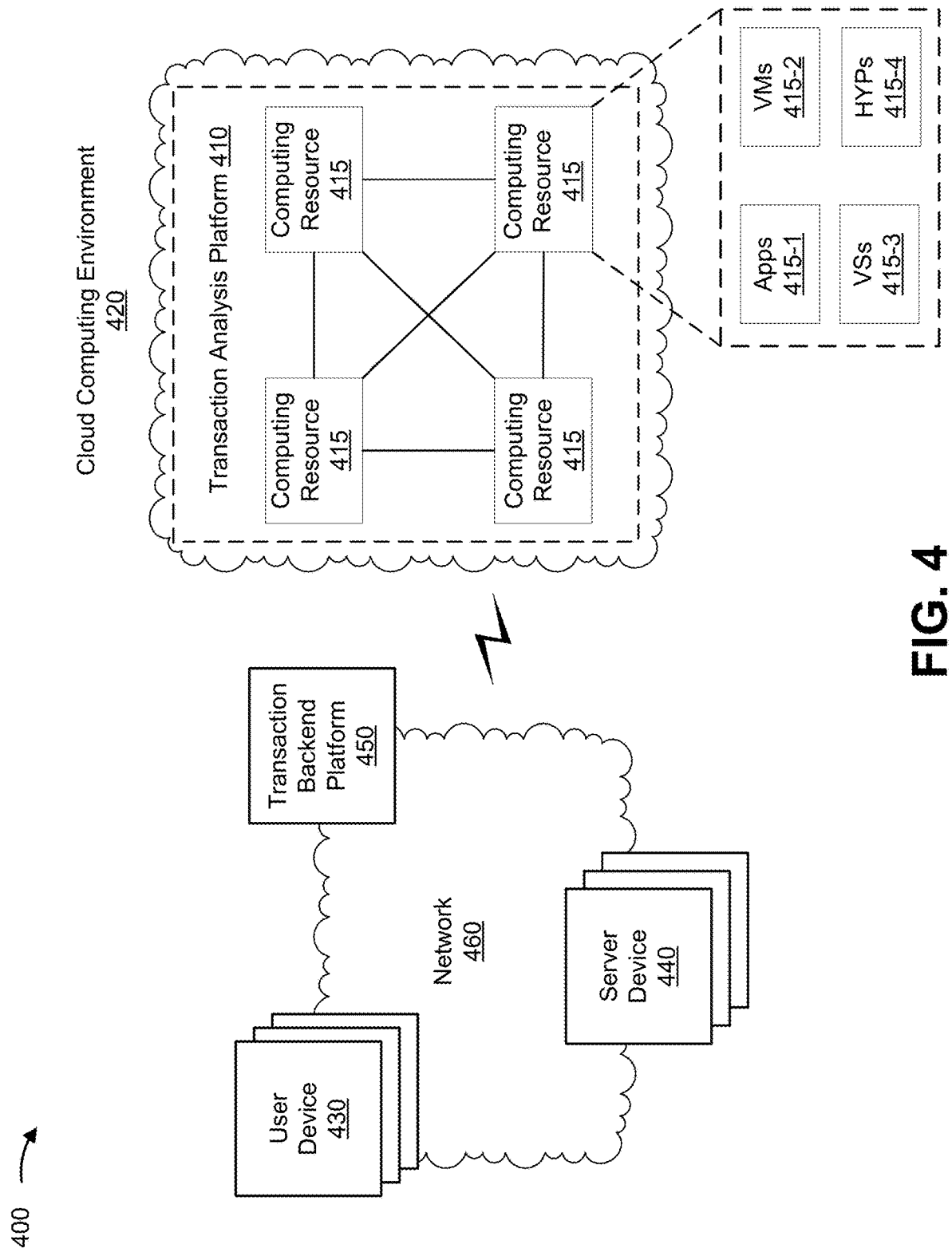
FIG. 4 is a diagram of an example environment in which systems and/or methods described herein may be implemented.

FIG. 4 is a diagram of an example environment 400 in which systems and/or methods, described herein, may be implemented. As shown in FIG. 4, environment 400 may include a transaction analysis platform 410, a cloud computing environment 420, one or more user devices 430 (referred to herein individually as user device 430 or collectively as user devices 430), one or more server devices 440 (referred to herein individually as server device 440 or collectively as server device 440), a transaction backend platform 450, and a network 460. In some implementations, the cloud computing environment 420 may host the transaction analysis platform 410 using one or more computing resources 415. Devices of environment 400 may interconnect via wired connections, wireless connections, or a combination of wired and wireless connections.

Transaction analysis platform 410 may include one or more computing resources to automatically execute a transaction based on transaction log analysis. For example, transaction analysis platform 410 may be a platform implemented by cloud computing environment 420 that may receive a preauthorization associated with missed transaction prevention for a transaction account of a user, monitor a transaction log of the transaction account, identify a transaction pattern associated with a merchant account based on a plurality of historical transactions identified in the transaction log being associated with the merchant account, determine that a historical transaction of the plurality of historical transactions was not automatically executed, determine that, based on the historical transaction not being automatically executed, that an upcoming transaction associated with the plurality of historical transactions is not scheduled to be executed, and/or cause the upcoming transaction to be automatically executed before a transaction period associated with the merchant account passes. In some implementations, transaction analysis platform 410 is implemented by computing resources 415 of cloud computing environment 420.

Transaction analysis platform 410 may include a server device or a group of server devices. In some implementations, transaction analysis platform 410 may be hosted in cloud computing environment 420. Notably, while implementations described herein may describe transaction analysis platform 410 as being hosted in cloud computing environment 420, in some implementations, transaction analysis platform 410 may be non-cloud-based or may be partially cloud-based.

Cloud computing environment 420 includes an environment that delivers computing as a service, whereby shared resources, services, and/or the like may be provided to the transaction analysis platform 410, the user devices 430, the server devices 440, the transaction backend platform 450, and/or the like. Cloud computing environment 420 may provide computation, software, data access, storage, and/or other services that do not require end-user knowledge of a physical location and configuration of a system and/or a device that delivers the services. As shown, cloud computing environment 420 may include transaction analysis platform 410 and computing resource 415.

Computing resource 415 includes one or more personal computers, workstation computers, server devices, or another type of computation and/or communication device. In some implementations, computing resource 415 may host transaction analysis platform 410. The cloud resources may include compute instances executing in computing resource 415, storage devices provided in computing resource 415, data transfer devices provided by computing resource 415, and/or the like. In some implementations, computing resource 415 may communicate with other computing resources 415 via wired connections, wireless connections, or a combination of wired and wireless connections.

As further shown in FIG. 4, computing resource 415 may include a group of cloud resources, such as one or more applications ("APPs") 415-1, one or more virtual machines ("VMs") 415-2, virtualized storage ("VSs") 415-3, one or more hypervisors ("HYPs") 415-4, or the like.

Application 415-1 includes one or more software applications that may be provided to or accessed by user device 430. Application 415-1 may eliminate a need to install and execute the software applications on user device 430. For example, application 415-1 may include software associated with transaction analysis platform 410 and/or any other software capable of being provided via cloud computing environment 420. In some implementations, one application 415-1 may send/receive information to/from one or more other applications 415-1, via virtual machine 415-2.

Virtual machine 415-2 includes a software implementation of a machine (e.g., a computer) that executes programs like a physical machine. Virtual machine 415-2 may be either a system virtual machine or a process virtual machine, depending upon use and degree of correspondence to any real machine by virtual machine 415-2. A system virtual machine may provide a complete system platform that supports execution of a complete operating system ("OS"). A process virtual machine may execute a single program and may support a single process. In some implementations, virtual machine 415-2 may execute on behalf of a user (e.g., user device 430), and may manage infrastructure of cloud computing environment 420, such as data management, synchronization, or long-duration data transfers.

Virtualized storage 415-3 includes one or more storage systems and/or one or more devices that use virtualization techniques within the storage systems or devices of computing resource 415. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 415-4 provides hardware virtualization techniques that allow multiple operating systems (e.g., "guest operating systems") to execute concurrently on a host computer, such as computing resource 415. Hypervisor 415-4 may present a virtual operating platform to the "guest operating systems" and may manage the execution of the guest operating systems. Multiple instances of a variety of operating systems may share virtualized hardware resources.

User device 430 includes one or more devices capable of receiving, generating, storing, processing, and/or providing information associated with a user (e.g., recurring transaction related information). For example, user device 430 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Server device 440 includes one or more devices capable of storing, processing, and/or routing information associated with recurring transaction related activity. For example, one or more of server devices 440 may host one or more transaction account platforms, merchant platforms, messaging platforms, merchant account platforms, and/or the like (e.g., similar to the platforms in FIG. 1A-1C). In some implementations, server device 440 may include a communication interface that allows server device 440 to receive information from and/or transmit information to other devices in environment 400.

Transaction backend platform 450 includes one or more devices capable of receiving, generating, storing, processing, and providing information associated with managing a transaction account of a user. For example, transaction account platform 450 may be associated with one or more server devices that include a communication interface that allows transaction backend platform 450 to receive information from and/or transmit information to other devices in environment 400. In some implementations, transaction backend platform 450 may include and/or have access to a data structure used to maintain a transaction log of an account of the user, profile information associated with the user, preferences associated with the user, and/or the like. In some implementations, the transaction backend platform 450 may be similar to the transaction account platform discussed with respect to FIGS. 1A-1C.

Network 460 includes one or more wired and/or wireless networks. For example, network 460 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices, platforms, and networks shown in FIG. 4 are provided as one or more examples. In practice, there may be additional devices, platforms, and/or networks, fewer devices, platforms, and/or networks, different devices, platforms, and/or networks, or differently arranged devices, platforms, and/or networks than those shown in FIG. 4. Furthermore, two or more devices and/or platforms shown in FIG. 4 may be implemented within a single device and/or platform, or a single device and/or platform shown in FIG. 4 may be implemented as multiple, distributed devices and/or platforms. Additionally, or alternatively, a set of devices and/or platforms (e.g., one or more devices and/or platforms) of environment 400 may perform one or more functions described as being performed by another set of devices and/or platforms of environment 400.

Figure 5:
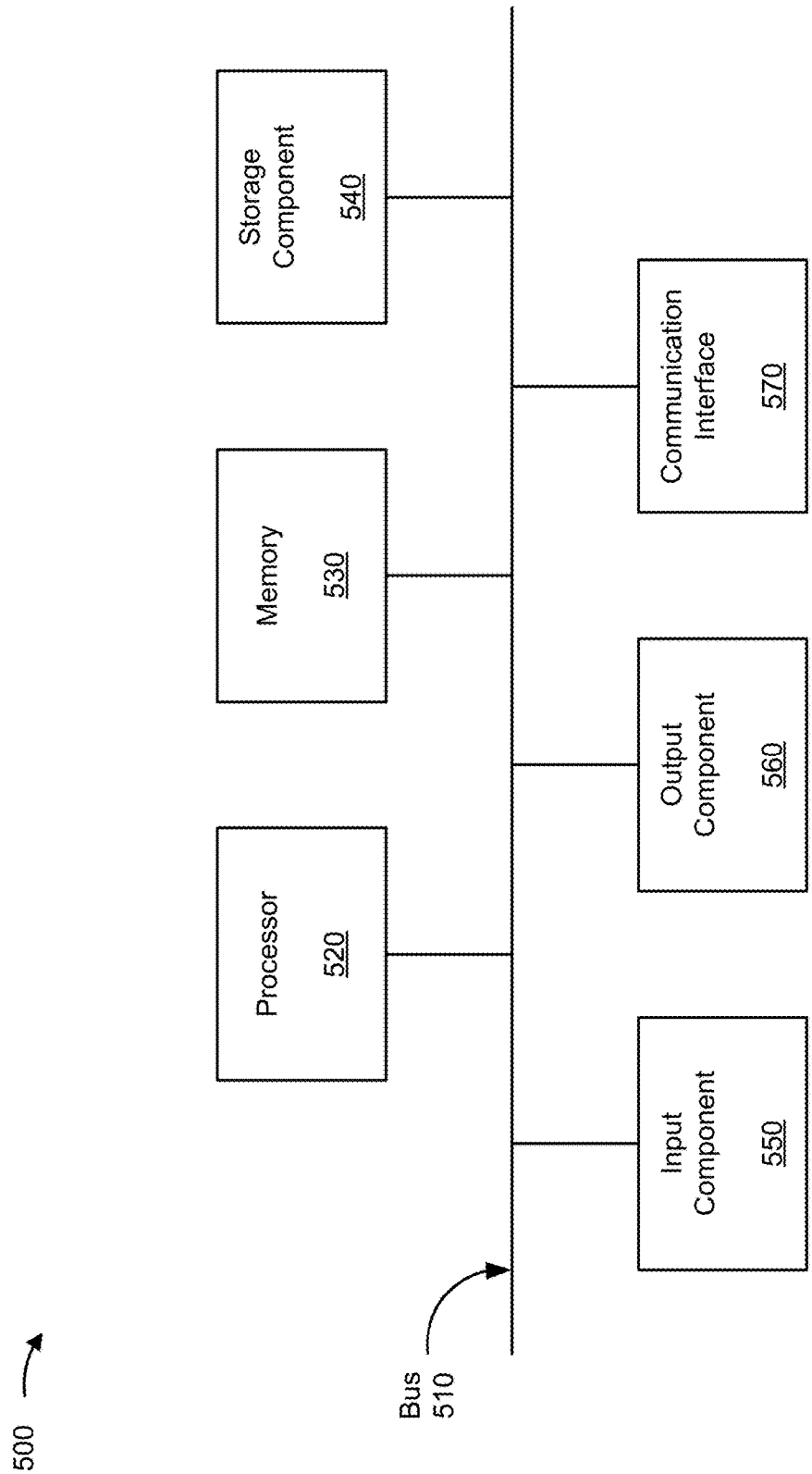
FIG. 5 is a diagram of example components of one or more devices of FIG. 2.

FIG. 5 is a diagram of example components of a device 500. Device 500 may correspond to transaction analysis platform 410, one or more user devices 430, one or more server devices 440, and/or transaction backend platform 450. In some implementations, transaction analysis platform 410, one or more user devices 430, one or more server devices 440, and/or transaction backend platform 450 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among multiple components of device 500. Processor 520 is implemented in hardware, firmware, and/or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a component for determining location (e.g., a global positioning system (GPS) component) and/or a sensor (e.g., an accelerometer, a gyroscope, an actuator, another type of positional or environmental sensor, and/or the like). Output component 560 includes a component that provides output information from device 500 (via, e.g., a display, a speaker, a haptic feedback component, an audio or visual indicator, and/or the like).

Communication interface 570 includes a transceiver-like component (e.g., a transceiver, a separate receiver, a separate transmitter, and/or the like) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

Device 500 may perform one or more processes described herein. Device 500 may perform these processes based on processor 520 executing software instructions stored by a non-transitory computer-readable medium, such as memory 530, and/or storage component 540. As used herein, the term "computer-readable medium" refers to a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
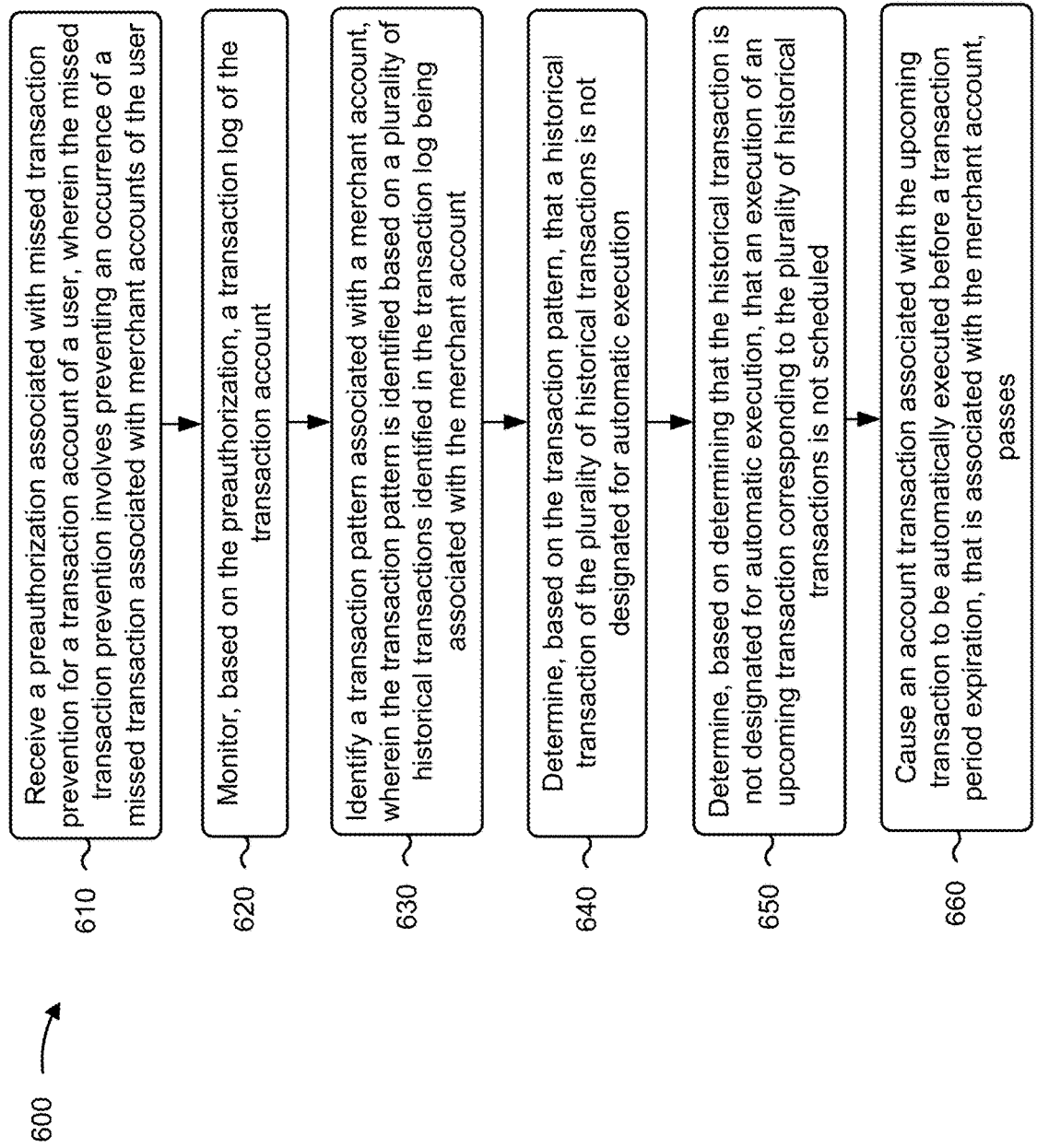

FIG. 6 is a flow chart of an example process 600 for automatic transaction execution based on transaction log analysis. In some implementations, one or more process blocks of FIG. 6 may be performed by a device (e.g., user device 430 and/or transaction analysis platform 410). In some implementations, one or more process blocks of FIG. 6 may be performed by another device or a group of devices separate from or including the device, such as a server device (e.g., server device 440), a transaction backend platform (e.g., transaction backend platform 450), and/or the like.

As shown in FIG. 6, process 600 may include receiving a preauthorization associated with missed transaction prevention for a transaction account of a user, wherein the missed transaction prevention involves preventing an occurrence of a missed transaction associated with merchant accounts of the user (block 610). For example, the device (e.g., using processor 520, memory 530, storage component 540, input component 550, output component 560, communication interface 570, and/or the like) may receive a preauthorization associated with missed transaction prevention for a transaction account of a user, as described above. In some implementations, the missed transaction prevention involves preventing an occurrence of a missed transaction associated with merchant accounts of the user.

As further shown in FIG. 6, process 600 may include monitoring, based on the preauthorization, a transaction log of the transaction account (block 620). For example, the device (e.g., using processor 520, memory 530, storage component 540, input component 550, output component 560, communication interface 570, and/or the like) may monitor, based on the preauthorization, a transaction log of the transaction account, as described above.

As further shown in FIG. 6, process 600 may include identifying a transaction pattern associated with a merchant account, wherein the transaction pattern is identified based on a plurality of historical transactions identified in the transaction log being associated with the merchant account (block 630). For example, the device (e.g., using processor 520, memory 530, storage component 540, input component 550, output component 560, communication interface 570, and/or the like) may identify a transaction pattern associated with a merchant account, as described above. In some implementations, the transaction pattern is identified based on a plurality of historical transactions identified in the transaction log being associated with the merchant account.

As further shown in FIG. 6, process 600 may include determining, based on the transaction pattern, that a historical transaction of the plurality of historical transactions is not designated for automatic execution (block 640). For example, the device (e.g., using processor 520, memory 530, storage component 540, input component 550, output component 560, communication interface 570, and/or the like) may determine, based on the transaction pattern, that a historical transaction of the plurality of historical transactions is not designated for automatic execution, as described above.

As further shown in FIG. 6, process 600 may include determining, based on determining that the historical transaction is not designated for automatic execution, that an execution of an upcoming transaction corresponding to the plurality of historical transactions is not scheduled (block 650). For example, the device (e.g., using processor 520, memory 530, storage component 540, input component 550, output component 560, communication interface 570, and/or the like) may determine, based on determining that the historical transaction is not designated for automatic execution, that an execution of an upcoming transaction corresponding to the plurality of historical transactions is not scheduled, as described above.

As further shown in FIG. 6, process 600 may include causing an account transaction associated with the upcoming transaction to be automatically executed before a transaction period expiration, that is associated with the merchant account, passes (block 660). For example, the device (e.g., using processor 520, memory 530, storage component 540, input component 550, output component 560, communication interface 570, and/or the like) may cause an account transaction associated with the upcoming transaction to be automatically executed before a transaction period expiration, that is associated with the merchant account, passes, as described above.

Process 600 may include additional implementations, such as any single implementation or any combination of implementations described below and/or in connection with one or more other processes described elsewhere herein.

In a first implementation, the preauthorization is received in association with a verification process that authenticates that the user provided the preauthorization.

In a second implementation, alone or in combination with the first implementation, the historical transaction corresponds to a most recent historical transaction of the plurality of historical transactions.

In a third implementation, alone or in combination with one or more of the first and second implementations, process 600 includes, before causing the account transaction to be automatically executed, determining that a status of the transaction account satisfies a threshold for performing the transaction, wherein based on the status of the transaction account satisfying the threshold, the account transaction is automatically executed using resources associated with the transaction account.

In a fourth implementation, alone or in combination with one or more of the first through third implementations, the transaction period expiration is determined according to the transaction pattern.

In a fifth implementation, alone or in combination with one or more of the first through fourth implementations, causing the account transaction to be automatically executed comprises at least one of: scheduling an execution of a transaction corresponding to the upcoming transaction, designating a transaction corresponding to the upcoming transaction for automatic execution, or executing, via a transaction back end system, a transaction with the merchant account that corresponds to the upcoming transaction.

In a sixth implementation, alone or in combination with one or more of the first through fifth implementations, process 600 includes at least one of: creating a transaction entry that corresponds to the transaction in the transaction log, sending a notification to a user device of the user to indicate that the transaction has been executed, or sending a notification to a platform that is associated with the merchant account to indicate that the transaction is associated with the user.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
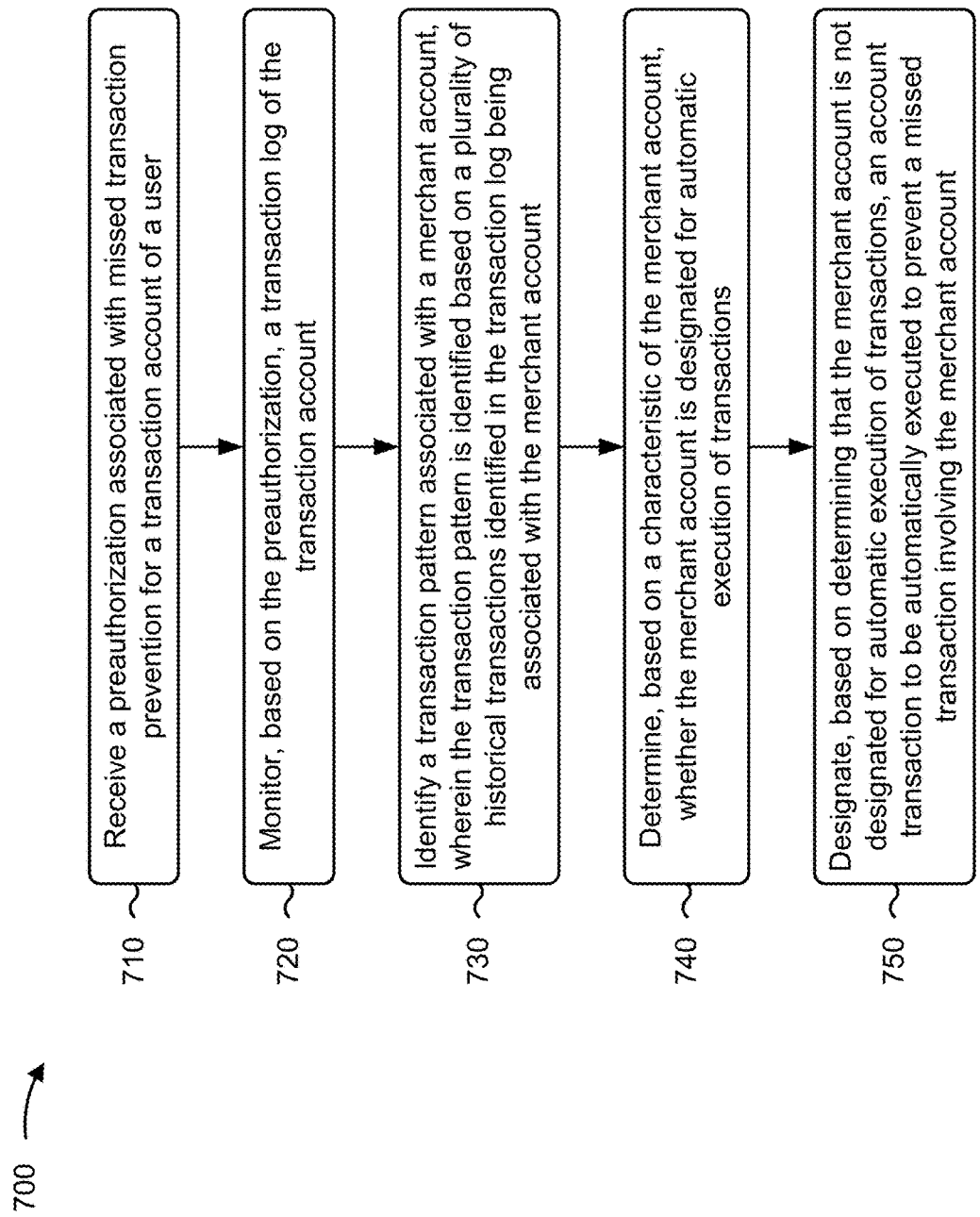

FIG. 7 is a flow chart of an example process 700 for automatic transaction execution based on transaction log analysis. In some implementations, one or more process blocks of FIG. 7 may be performed by a device (e.g., user device 430 and/or transaction analysis platform 410). In some implementations, one or more process blocks of FIG. 7 may be performed by another device or a group of devices separate from or including the device, such as a server device (e.g., server device 440), a transaction backend platform (e.g., transaction backend platform 450), and/or the like.

As shown in FIG. 7, process 700 may include receiving a preauthorization associated with missed transaction prevention for a transaction account of a user (block 710). For example, the device (e.g., using processor 520, memory 530, storage component 540, input component 550, output component 560, communication interface 570, and/or the like) may receive a preauthorization associated with missed transaction prevention for a transaction account of a user, as described above.

As further shown in FIG. 7, process 700 may include monitoring, based on the preauthorization, a transaction log of the transaction account (block 720). For example, the device (e.g., using processor 520, memory 530, storage component 540, input component 550, output component 560, communication interface 570, and/or the like) may monitor, based on the preauthorization, a transaction log of the transaction account, as described above.

As further shown in FIG. 7, process 700 may include identifying a transaction pattern associated with a merchant account, wherein the transaction pattern is identified based on a plurality of historical transactions identified in the transaction log being associated with the merchant account (block 730). For example, the device (e.g., using processor 520, memory 530, storage component 540, input component 550, output component 560, communication interface 570, and/or the like) may identify a transaction pattern associated with a merchant account, as described above. In some implementations, the transaction pattern is identified based on a plurality of historical transactions identified in the transaction log being associated with the merchant account.

As further shown in FIG. 7, process 700 may include determining, based on a characteristic of the merchant account, whether the merchant account is designated for automatic execution of transactions (block 740). For example, the device (e.g., using processor 520, memory 530, storage component 540, input component 550, output component 560, communication interface 570, and/or the like) may determine, based on a characteristic of the merchant account, whether the merchant account is designated for automatic execution of transactions, as described above.

As further shown in FIG. 7, process 700 may include designating, based on determining that the merchant account is not designated for automatic execution of transactions, an account transaction to be automatically executed to prevent a missed transaction involving the merchant account (block 750). For example, the device (e.g., using processor 520, memory 530, storage component 540, input component 550, output component 560, communication interface 570, and/or the like) may designate, based on determining that the merchant account is not designated for automatic execution of transactions, an account transaction to be automatically executed to prevent a missed transaction involving the merchant account, as described above.

Process 700 may include additional implementations, such as any single implementation or any combination of implementations described below and/or in connection with one or more other processes described elsewhere herein.

In a first implementation, the preauthorization is specifically associated with the merchant account.

In a second implementation, alone or in combination with the first implementation, process 700 may include, when determining whether the merchant account is designated for automatic execution of transactions, determining at least one of: whether an automatic transaction setting of the merchant account has been activated, or whether a user has authorized automatic transactions between the transaction account and the merchant account.

In a third implementation, alone or in combination with one or more of the first and second implementations, the transaction account is a first transaction account, and process 700 may include determining that a status of the transaction account does not satisfy a threshold for executing the account transaction, wherein, based on the status of the transaction account not satisfying the threshold, the transaction is executed using resources associated with a second transaction account that is different from the first transaction account and is associated with the user.

In a fourth implementation, alone or in combination with one or more of the first through third implementations, process 700 may include, before causing the transaction to be executed, requesting the user to authorize the transaction, wherein the transaction is being caused to be executed based on the user providing an authorization to perform the transaction.

In a fifth implementation, alone or in combination with one or more of the first through fourth implementations, process 700 may include, when causing the account transaction to be automatically executed, scheduling a transaction for execution based on a characteristic of the plurality of historical transactions, or executing a transaction based on the characteristic of the plurality of historical transactions.

In a sixth implementation, alone or in combination with one or more of the first through fifth implementations, process 700 includes sending a notification to a user device of the user to indicate that the transaction has been executed.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a flow chart of an example process 800 for automatic transaction execution based on transaction log analysis. In some implementations, one or more process blocks of FIG. 8 may be performed by a device (e.g., user device 430 and/or transaction analysis platform 410). In some implementations, one or more process blocks of FIG. 8 may be performed by another device or a group of devices separate from or including the device, such as a server device (e.g., server device 440), a transaction backend platform (e.g., transaction backend platform 450), and/or the like.

As shown in FIG. 8, process 800 may include monitoring, based on receiving a preauthorization, a transaction log of a transaction account of a user, wherein the preauthorization is associated with missed transaction prevention for the transaction account (block 810). For example, the device (e.g., using processor 520, memory 530, storage component 540, input component 550, output component 560, communication interface 570, and/or the like) may monitor, based on receiving a preauthorization, a transaction log of a transaction account of a user, as described above. In some implementations, the preauthorization is associated with missed transaction prevention for the transaction account.

As further shown in FIG. 8, process 800 may include identifying a transaction pattern associated with a merchant account, wherein the transaction pattern is identified based on a plurality of historical transactions identified in the transaction log being associated with the merchant account (block 820). For example, the device (e.g., using processor 520, memory 530, storage component 540, input component 550, output component 560, communication interface 570, and/or the like) may identify a transaction pattern associated with a merchant account, as described above. In some implementations, the transaction pattern is identified based on a plurality of historical transactions identified in the transaction log being associated with the merchant account.

As further shown in FIG. 8, process 800 may include determining a characteristic associated with an upcoming transaction that corresponds to the plurality of historical transactions (block 830). For example, the device (e.g., using processor 520, memory 530, storage component 540, input component 550, output component 560, communication interface 570, and/or the like) may determine a characteristic associated with an upcoming transaction that corresponds to the plurality of historical transactions, as described above.

As further shown in FIG. 8, process 800 may include determining, based on the characteristic, whether an execution of the upcoming transaction is scheduled before a transaction period expiration (block 840). For example, the device (e.g., using processor 520, memory 530, storage component 540, input component 550, output component 560, communication interface 570, and/or the like) may determine, based on the characteristic, whether an execution of the upcoming transaction is scheduled before a transaction period expiration, as described above.

As further shown in FIG. 8, process 800 may include designating, based on determining that the execution of the upcoming transaction is not scheduled, an account transaction to be automatically executed before the transaction period expiration passes, wherein the account transaction corresponds to the upcoming transaction (block 850). For example, the device (e.g., using processor 520, memory 530, storage component 540, input component 550, output component 560, communication interface 570, and/or the like) may designate, based on determining that the execution of the upcoming transaction is not scheduled, an account transaction to be automatically executed before the transaction period expiration passes, as described above. In some implementations, the account transaction corresponds to the upcoming transaction.

Process 800 may include additional implementations, such as any single implementation or any combination of implementations described below and/or in connection with one or more other processes described elsewhere herein.

In a first implementation, the preauthorization is specifically associated with the merchant account.

In a second implementation, alone or in combination with the first implementation, the preauthorization is received in association with a verification process that authenticates that the user provided the preauthorization.

In a third implementation, alone or in combination with one or more of the first and second implementations, the transaction pattern is identified based on the plurality of historical transactions being identified in the transaction log as having at least one of: a same value, a related date of execution, or a related period of execution between subsequent transactions of the plurality of historical transactions.

In a fourth implementation, alone or in combination with one or more of the first through third implementations, process 800 may include, when determining whether the execution of the upcoming transaction is scheduled, determining at least one of: whether the merchant account is associated with engaging in automatic transactions, whether one or more of the plurality of historical transactions are an automatic transaction, or whether a user input indicates whether the merchant account is associated with automatic execution.

In a fifth implementation, alone or in combination with one or more of the first through fourth implementations, process 800 may include, before causing the transaction to be executed, requesting the user to authorize the transaction, wherein the transaction is caused to be executed based on the user providing an authorization to perform the transaction.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   receiving, by a device, a preauthorization that is associated with configuring level of access for accessing information associated with a first account;
   configuring, based on the preauthorization, the device to have limited access to the first account;
   monitoring, by the device, a transaction log associated with the first account;
   identifying, by the device, one or more recurring transactions, associated with a second account,
      wherein the one or more recurring transactions are identified based on a plurality of historical transactions identified in the transaction log as being associated with the second account and based on execution of one or more machine learning models that utilize at least a regression algorithm;
   monitoring, by the device, online activity associated with the second account;
   making a first determination, by the device, based on the monitored online activity, and based on the one or more recurring transactions, that information associated with a historical transaction of the plurality of historical transactions does not indicate that the historical transaction is set for automatic processing;
   making a second determination, by the device, that an upcoming transaction associated with the historical transaction is not scheduled to be processed at a future time; and
   causing, by the device, based on the first determination and the second determination, a transaction associated with the upcoming transaction to be automatically executed before a time period associated with the second account expires.

2. The method of claim 1, wherein the preauthorization is associated with at least one of:
   identifying one or more second accounts including the second account, or
   one or more first accounts, including the first account, that the device may access.

3. The method of claim 1, wherein receiving the preauthorization is associated with verification that the preauthorization was provided by a user associated with the first account.

4. The method of claim 1, wherein causing the transaction to be automatically executed is based on determining that information associated with the first account satisfies a threshold for performing the transaction.

5. The method of claim 1, further comprising:
   sending a notification to another device associated with the first account.

6. The method of claim 1, further comprising:
   sending a notification to a platform that is associated with the second account.

7. The method of claim 1, wherein the transaction log includes at least one of a transaction identifier, a date associated with the transaction, or a merchant identifier.

8. A device, comprising:
   one or more memories; and
   one or more processors, coupled to the one or more memories, configured to:
      receive a preauthorization that is associated with configuring level of access for accessing information associated with a first account;
      configure the device to have limited access to the first account;
      monitor a transaction log associated with the first account;
      identify one or more recurring transactions associated with a second account,
         wherein the one or more recurring transactions are identified based on a plurality of historical transactions as being associated with the second account and based on execution of one or more machine learning models;
      monitor online activity associated with the second account;
      make a first determination based on the monitored online activity, and based on the one or more recurring transactions, that information associated with a historical transaction of the plurality of historical transactions does not indicate that the historical transaction is set for automatic processing;
      make a second determination that an upcoming transaction associated with the historical transaction is not scheduled to be processed at a future time; and
      cause, based on the first determination and the second determination, a transaction associated with the upcoming transaction to be automatically executed before a time period associated with the second account expires.

9. The device of claim 8, wherein the preauthorization is associated with at least one of:
   identifying one or more second accounts including the second account, or
   one or more first accounts, including the first account, that the device may access.

10. The device of claim 8, wherein receiving the preauthorization is associated with verification that the preauthorization was provided by a user associated with the first account.

11. The device of claim 8, wherein causing the transaction to be automatically executed is based on determining that information associated with the first account satisfies a threshold for performing the transaction.

12. The device of claim 8, wherein the one or more processors are further configured to:
   send a notification to another device associated with the first account.

13. The device of claim 8, wherein the one or more processors are further configured to:
   send a notification to a platform that is associated with the second account,
      wherein the notification indicates that the automatically executed transaction is associated with a user related to the first account.

14. The device of claim 8, wherein the transaction log includes at least one of a transaction identifier, a date associated with the transaction, or a merchant identifier.

15. A non-transitory computer-readable medium storing a set of instructions, the set of instructions comprising:
   one or more instructions that, when executed by one or more processors of a device, cause the device to:

receive a preauthorization that is associated with configuring level of access for accessing information associated with a first account;

configure the device to have limited access to the first account;

monitor a transaction log associated with the first account;

identify one or more recurring transactions associated with a second account,
- wherein the one or more recurring transactions are identified based on a plurality of historical transactions as being associated with the second account and based on execution of one or more machine learning models;

monitor online activity associated with the second account;

make a first determination based on the monitored online activity, and based on the one or more recurring transactions, that information associated with a historical transaction of the plurality of historical transactions does not indicate that the historical transaction is set for automatic processing;

make a second determination that an upcoming transaction associated with the historical transaction is not scheduled to be processed at a future time;

cause, based on the first determination and the second determination, a transaction associated with the upcoming transaction to be automatically executed before a time period associated with the second account expires.

16. The non-transitory computer-readable medium of claim 15, wherein the preauthorization is associated with at least one of:
- identifying one or more second accounts including the second account, or
- one or more first accounts, including the first account, that the device may access.

17. The non-transitory computer-readable medium of claim 15, wherein receiving the preauthorization is associated with verification that the preauthorization was provided by a user associated with the first account.

18. The non-transitory computer-readable medium of claim 15, wherein causing the transaction to be automatically executed is based on determining that information associated with the first account satisfies a threshold for performing the transaction.

19. The non-transitory computer-readable medium of claim 15, wherein the one or more instructions further cause the device to:
- send a notification to another device associated with the first account.

20. The non-transitory computer-readable medium of claim 15, wherein the transaction log includes at least one of a transaction identifier, a date associated with the transaction, or a merchant identifier.

* * * * *